US010851277B2

United States Patent
Takagi et al.

(10) Patent No.: US 10,851,277 B2
(45) Date of Patent: Dec. 1, 2020

(54) HIGHLY FILLED HIGH THERMAL CONDUCTIVE MATERIAL, METHOD FOR MANUFACTURING SAME, COMPOSITION, COATING LIQUID AND MOLDED ARTICLE

(71) Applicant: Takagi Chemicals, Inc., Aichi (JP)

(72) Inventors: Noriaki Takagi, Aichi (JP); Yuusuke Nagatani, Aichi (JP); Yuuta Terao, Aichi (JP); Kazuo Matsuyama, Aichi (JP); Tsutomu Takeichi, Aichi (JP); Akihiko Matsumoto, Aichi (JP)

(73) Assignee: TAKAGI CHEMICALS, INC., Aichi (JP)

( * ) Notice: Subject to any disclaimer, the term of this patent is extended or adjusted under 35 U.S.C. 154(b) by 45 days.

(21) Appl. No.: 16/244,730

(22) Filed: Jan. 10, 2019

(65) Prior Publication Data

US 2019/0309204 A1    Oct. 10, 2019

Related U.S. Application Data

(62) Division of application No. 14/404,219, filed as application No. PCT/JP2013/079735 on Nov. 1, 2013, now abandoned.

(30) Foreign Application Priority Data

Nov. 21, 2012    (JP) ................................ 2012-255704

(51) Int. Cl.
  *C09K 5/14*    (2006.01)
  *C09D 7/40*    (2018.01)
  (Continued)

(52) U.S. Cl.
  CPC ............... *C09K 5/14* (2013.01); *B32B 5/022* (2013.01); *B32B 5/16* (2013.01); *B32B 5/24* (2013.01); *B32B 5/30* (2013.01); *B32B 7/02* (2013.01); *B32B 7/04* (2013.01); *B32B 27/08* (2013.01); *B32B 27/20* (2013.01); *B32B 27/286* (2013.01); *B32B 27/36* (2013.01); *C08K 3/04* (2013.01); *C08K 3/38* (2013.01); *C08K 7/06* (2013.01); *C08K 7/14* (2013.01); *C08L 101/00* (2013.01); *C09D 5/24* (2013.01); *C09D 7/40* (2018.01); *C09D 7/61* (2018.01); *C09D 201/00* (2013.01); *B32B 2250/02* (2013.01); *B32B 2250/24* (2013.01); *B32B 2260/025* (2013.01); *B32B 2260/046* (2013.01); *B32B 2262/101* (2013.01); *B32B 2262/103* (2013.01); *B32B 2262/106* (2013.01); *B32B 2264/025* (2013.01); *B32B 2264/0207* (2013.01); *B32B 2264/0214* (2013.01); *B32B 2264/0221* (2013.01); *B32B 2264/0235* (2013.01); *B32B 2264/0242* (2013.01); *B32B 2264/0257* (2013.01); *B32B 2264/0264* (2013.01); *B32B 2264/0278* (2013.01); *B32B 2264/0285* (2013.01); *B32B 2264/101* (2013.01); *B32B 2264/102* (2013.01); *B32B 2264/104* (2013.01);
  (Continued)

(58) Field of Classification Search
  CPC .. C08K 3/04; C08K 7/14; B32B 27/08; B32B 7/02; B32B 5/30; B32B 5/24; C09D 201/00
  USPC .......................................................... 428/480
  See application file for complete search history.

(56) References Cited

U.S. PATENT DOCUMENTS

| 5,300,553 | A |   | 4/1994 | Yamanashi et al. |
| 5,482,798 | A | * | 1/1996 | Mototani ............. H01M 4/625 429/224 |

(Continued)

FOREIGN PATENT DOCUMENTS

| EP | 2770028 A1 | 8/2014 |
| JP | H05105781 A | 4/1993 |

(Continued)

OTHER PUBLICATIONS

International Search Report for PCT/JP2013/079735.

*Primary Examiner* — Doris L Lee
(74) *Attorney, Agent, or Firm* — Fox Rothschild LLP

(57) ABSTRACT

[Problem] Provided are a high filler-loaded high thermal conductive material which sufficiently utilizes features of an organic polymer while ameliorating drawbacks, enables integrated molding with ceramics, metals, semiconductor elements and the like, and has a low coefficient of thermal expansion and a high thermal conductivity; and a method for producing the high filler-loaded high thermal conductive material, a composition, coating liquid and a molded article.

[Solution] Disclosed is a high filler-loaded high thermal conductive material formed by subjecting a composition which includes organic polymer particles and a thermally conductive filler having a graphite-like structure, and includes 5 to 60% by weight of the organic polymer particles and 40 to 95% by weight of the thermally conductive filler having a graphite-like structure relative to 100% by weight of the total amount of these components, is obtained, so that the thermally conductive filler is dispersed by delamination while maintaining the average planar particle size of the thermally conductive filler, and is capable of forming a thermally conductive infinite cluster; to press molding at a temperature higher than equal to the deflection temperature under load, melting point or glass transition temperature of the organic polymer and a pressure of 1 to 1000 kgf/cm$^2$; and to cooling and solidification.

13 Claims, 12 Drawing Sheets

(51) Int. Cl.

| | | |
|---|---|---|
| C09D 7/61 | (2018.01) | |
| B32B 5/02 | (2006.01) | |
| B32B 5/16 | (2006.01) | |
| B32B 5/24 | (2006.01) | |
| B32B 5/30 | (2006.01) | |
| B32B 7/02 | (2019.01) | |
| B32B 7/04 | (2019.01) | |
| C08K 3/04 | (2006.01) | |
| C08K 3/38 | (2006.01) | |
| C08K 7/06 | (2006.01) | |
| C08K 7/14 | (2006.01) | |
| C08L 101/00 | (2006.01) | |
| C09D 5/24 | (2006.01) | |
| C09D 201/00 | (2006.01) | |
| B32B 27/08 | (2006.01) | |
| B32B 27/20 | (2006.01) | |
| B32B 27/28 | (2006.01) | |
| B32B 27/36 | (2006.01) | |

(52) U.S. Cl.
CPC ... *B32B 2264/105* (2013.01); *B32B 2264/107* (2013.01); *B32B 2264/108* (2013.01); *B32B 2264/12* (2013.01); *B32B 2307/202* (2013.01); *B32B 2307/302* (2013.01); *B32B 2307/304* (2013.01); *B32B 2307/308* (2013.01); *B32B 2307/54* (2013.01); *B32B 2307/546* (2013.01); *B32B 2307/58* (2013.01); *B32B 2307/72* (2013.01); *B32B 2307/734* (2013.01); *B32B 2451/00* (2013.01); *B32B 2457/08* (2013.01); *B32B 2457/14* (2013.01); *B32B 2457/18* (2013.01); *B32B 2457/202* (2013.01); *C08K 2003/385* (2013.01); *C08K 2201/005* (2013.01); *Y10T 428/31786* (2015.04)

(56) References Cited

U.S. PATENT DOCUMENTS

| | | |
|---|---|---|
| 5,776,372 A | 7/1998 | Saito et al. |
| 5,863,467 A | 1/1999 | Mariner et al. |
| 2004/0119056 A1* | 6/2004 | Hofmann ............... C08L 81/06 252/500 |
| 2008/0079146 A1 | 4/2008 | Hattori et al. |
| 2008/0153960 A1 | 6/2008 | Meneghetti et al. |
| 2008/0287590 A1 | 11/2008 | Takahashi et al. |
| 2008/0295955 A1 | 12/2008 | Cawse et al. |
| 2013/0112389 A1 | 5/2013 | Yajima et al. |

FOREIGN PATENT DOCUMENTS

| | | |
|---|---|---|
| JP | H09153566 A | 6/1997 |
| JP | H111621 A | 1/1999 |
| JP | 2003082229 A | 3/2003 |
| JP | 2004339290 A | 12/2004 |
| JP | 2004339484 A | 12/2004 |
| JP | 2006282678 A | 10/2006 |
| JP | 2007106902 A | 4/2007 |
| JP | 2007169461 A | 7/2007 |
| JP | 2010024343 A | 2/2010 |
| JP | 2010505729 A | 2/2010 |
| JP | 4631272 B2 | 2/2011 |
| JP | 2011162642 A | 8/2011 |
| JP | 2011231159 A | 11/2011 |
| JP | 2011231196 A | 11/2011 |
| JP | 2012082296 A | 4/2012 |
| JP | 2012087193 A | 5/2012 |
| JP | 4963831 B2 | 6/2012 |
| WO | 2011158565 A1 | 12/2011 |
| WO | 2013099089 A1 | 7/2013 |

* cited by examiner

HIGHLY FILLED HIGH THERMAL CONDUCTIVE MATERIAL, METHOD FOR MANUFACTURING SAME, COMPOSITION, COATING LIQUID AND MOLDED ARTICLE

CROSS-REFERENCE TO RELATED APPLICATIONS

This application is a Divisional of U.S. patent application Ser. No. 14/404,219, filed Nov. 26, 2014, which is the U.S. National Phase Application of International Application No. PCT/JP2013/079735, filed Nov. 1, 2013, which claims priority to JP Application No. 2012-255704, Nov. 21, 2012, the disclosures of which are hereby incorporated by reference in their entireties.

TECHNICAL FIELD

The present invention relates to a high filler-loaded high thermal conductive material, a method for producing the same, a composition, a coating liquid and a molded article.

BACKGROUND ART

Along with the performance enhancement, functional enhancement, miniaturization, and expansion of the range of applications of electronic equipment, the issue of heat associated with semiconductor elements such as CPU, driver elements, electronic transducers, thermoelectric conversion elements (Peltier cooling, Seebeck power generation) and light emitting elements (laser, LED, organic EL, and the like) used therein, lithium ion batteries, fuel cells, and the like that are used in the electronic equipment, has posed a significant problem. Thus, investigations have been conducted on the removal of this heat, from various aspects such as a material aspect and a structural aspect.

Furthermore, also for automobiles, which are used under severe conditions for environmental changes such as vibration and temperature so that safety is emphasized, the heat dissipation problem that comes with the progress of electronization and electrification has been brought into limelight. Thus, in addition to the demand for weight reduction, there is also a demand for the emergence of new materials which will replace metals, ceramics, and organic/inorganic composite materials that have been conventionally used, and emergence and diffusion of next-generation vehicles such as hybrid vehicles, electric vehicles and fuel cell vehicles are even accelerating this phenomenon.

In particular, organic polymers can be easily molded and processed and can contribute to weight reduction, and various modifications thereof can be easily made to meet the conditions of use associated with environmental changes. Therefore, there are high expectations on organic polymers in the fields of automobiles and electronic equipment. However, since the thermal conductivities of organic polymers are as extremely low as 0.1 to 0.5 W/mK, and the coefficients of thermal expansion are relatively high such as $50 \times 10^{-6}$ to $100 \times 10^{-6\circ}$ C.$^{-1}$, there is a problem when the organic polymers are used in combination with semiconductor elements, ceramics and the like having low coefficients of thermal expansion ($3 \times 10^{-6}$ to $8 \times 10^{-6\circ}$ C.$^{-1}$). Thus, emergence of an innovative material having a high thermal conductivity and a low coefficient of thermal expansion is earnestly desired.

Meanwhile, regarding heat conduction of materials, there are known three types of forms of conduction: (1) electronic conduction, (2) phonon conduction (lattice vibration), and (3) photon conduction (radiation). For example, diamond, one of carbon materials, has a rigid, chemically combined structure without any heat loss, and has the highest thermal conductivity of 1000 to 2000 W/mK induced by phonon conduction. This is because there is no asymmetric chemical bond, or no loss of heat energy caused by molecular movement. Also, graphite (synonym for black lead) has a high thermal conductivity due to electron transfer in the orientation direction of benzene rings. More specifically, a PSG graphite sheet has a thermal conductivity of 8 W/mK in the thickness direction, and a thermal conductivity of near 800 W/mK in the plane direction perpendicular to the thickness direction due to electron transfer, and is therefore a conductive material. On the other hand, hexagonal boron nitride has a graphite-like structure, and exhibits anisotropy by having a thermal conductivity of 200 W/mK in the plane direction and a thermal conductivity of some W/mK in the thickness direction; however, hexagonal boron nitride is an insulating material. Furthermore, regarding heat radiation which is photon conduction, organic polymer materials and carbon materials generally exhibit higher values than metals. Furthermore, the coefficients of thermal expansion of carbon materials range from $1 \times 10^{-6}$ to $5 \times 10^{-6\circ}$ C.$^{-1}$, which are lower than the coefficients of organic polymer materials ($50 \times 10^{-6}$ to $100 \times 10^{-6\circ}$ C.$^{-1}$) and closer to those of ceramics and semiconductor elements. Thus, carbon materials are low thermal expansion materials. In addition, metal materials have intermediate values such as $10 \times 10^{-6}$ to $30 \times 10^{-6\circ}$ C.$^{-1}$.

Metals that have been traditionally used have excellent electrical conductivity and thermal conductivity; however, metals have high specific gravity, have low heat radiation rates, and are inapt for processing into complicated shapes. Ceramics have excellent electrical insulating properties; however, ceramics are brittle and unsuitable for processing into complicated shapes, and require high energy at the time of production and at the time of processing.

Under such circumstances, in order to ameliorate these drawbacks, attention has been paid to the development of a composite material formed from a thermally conductive material having a graphite-like structure, and an organic polymer.

For example, Patent Literature 1 discloses a material obtained by binding a mixture of a metal powder and carbon fiber using a fluorine resin in an amount of 0.5% to 20% by weight with respect to the mixture, and compression molding the mixture into a predetermined shape. According to Patent Literature 1, it is described that the material obtained as described above has excellent thermal expansion controllability, thermal conductivity, and electrical conductivity.

Furthermore, Patent Literature 2 discloses a resin composition including 10% to 60 by weight of a resin such as polyphenylene sulfide, and 40 to 90% by weight of graphite having a particle size of 20 to 900 μm. According to Patent Literature 2, it is described that a molded article having a thermal conductivity of 2 to 12 W/mK is obtained by injection molding or the like of the composition.

Furthermore, Patent Literature 3 discloses a high filler-loaded resin composition including: (a) 5 to 50% by weight of a thermoplastic resin, and (b) 95 to 50% by weight of an inorganic filler, in which (c) any one or more of a fatty acid metal salt, an ester-based compound, an amide group-containing compound, an epoxy-based compound, and a phosphoric acid ester is added in an amount of 0.5 to 10 parts by weight relative to 100 parts by weight of the total amount of (a) and (b). According to Patent Literature 3, it is described that a molded article having a thermal conductivity of 2 to 32 W/mK is obtained by injection molding of the composition.

Furthermore, Patent Literature 4 discloses, in order to suppress damage of carbon fiber in a kneading process, a method for producing a high thermal conductive resin composition obtainable by melt kneading short carbon fibers having an average fiber diameter of 5 to 20 µm and an average fiber length of 20 to 500 µm, and a matrix resin.

However, the material described in Patent Literature 1 contains a metal powder as a main ingredient, and the characteristics of the carbon fiber and the resin are not sufficiently reflected.

Furthermore, the resin compositions and the like described in Patent Literatures 2 to 4 basically involve melt kneading and molding a thermally conductive filler and/or carbon fiber and an organic polymer material. Therefore, as a molten organic polymer material covers the surface of the thermally conductive filler, formation of a thermally conductive path is inhibited, and the characteristics such as thermal conductivity inherently possessed by the thermally conductive material cannot be sufficiently exhibited.

On the contrary, Patent Literature 5 discloses a structure having a thermal conductivity of 7 W/mK or more, in which polymer particles and a carbon filler containing carbon fiber as an essential component are dry mixed so as to have a phase A formed from a polymer and a phase B containing a carbon filler as a main component, and the phase B forms a three-dimensional network structure.

Furthermore, Patent Literature 6 discloses, in order to reduce damage of highly rigid carbon fiber, a powder molded article having excellent thermal conductivity, which includes 20 to 1000 parts by volume of a pitch-based graphitized carbon fiber having an aspect ratio of 4 to 100 and an average fiber length of 20 to 500 µm relative to 100 parts by volume of a matrix component.

Patent Literatures 5 and 6 are both intended to obtain a structure or a molded article by dry blending (dry mixing)—compression molding (press molding). However, the carbon fiber used in the production of the structure described in Patent Literature 5 is a special ultrafine carbon fiber (vapor grown carbon fiber) usually called carbon nanofiber, and requires a special apparatus for the production, while the carbon nanofiber is highly expensive with limited uses. Furthermore, the powder molded article described in Patent Literature 6 cannot sufficiently exhibit the properties of the carbon fiber because, since the ingredients are mixed so as to maintain the original fiber length, uniform mixing of the matrix resin and the carbon fiber is not achieved.

In addition, reports have been made on an attempt to accelerate crystallization of a resin molded article by adding a crystallization accelerating agent, and to enhance the physical properties of a molded body.

For example, Patent Literature 7 discloses a high thermal conductive thermoplastic resin composition obtained by adding a thermally conductive filler and a crystal nucleating agent to a thermoplastic resin having a mesogen group and a spacer.

Furthermore, Patent Literature 8 discloses that an ultrafine carbon fiber having a fiber diameter of 0.0001 to 5 µm and an aspect ratio of 5 to 15,000 is used as a resin crystallization accelerating agent.

However, Patent Literatures 7 and 8 are intended to accelerate crystallization of the resin by using a crystal nucleating agent such as talc, or a resin crystallization accelerating agent such as ultrafine carbon fiber, and to enhance the physical properties of molded articles. Since a resin composition is melt blended, however, the features of the thermally conductive filler or carbon fiber cannot be sufficiently utilized in an effective manner, and the Patent Literatures do not mention about crystallization of the resin and intensive formation of thermal conduction paths.

On the other hand, in regard to an enhancement of thermal conduction by using a crystalline aromatic thermosetting resin, Patent Literature 9 discloses a resin composite composition including a benzoxazine derivative, a polycyclic aromatic type epoxy resin, and an inorganic filler. However, there are no particular limitations on the molding method except that template curing is carried out after melt blending, and there is no disclosure on a resin composite composition including a thermoplastic resin.

CITATION LIST

Patent Literatures

Patent Literature 1: JP-H09-153566 A
Patent Literature 2: JP-2004-339290 A
Patent Literature 3: JP-4631272 B
Patent Literature 4: JP-2012-82296 A
Patent Literature 5: JP-4963831 B
Patent Literature 6: JP-2010-24343 A
Patent Literature 7: JP-2011-231159 A
Patent Literature 8: JP-2004-339484 A
Patent Literature 9: JP-2011-231196 A

SUMMARY OF THE INVENTION

Organic polymers have excellent features that are not found in other materials; however, in composite materials thereof with thermally conductive materials (thermally conductive fillers and short carbon fibers), the thermally conductive materials cannot sufficiently exhibit inherent properties intrinsically, such as high thermal conductivity. This is considered to be because the thermal conductivities of organic polymers are extremely low, and since the organic polymers have high fluidity at the time of fusion, a thick thermal conduction inhibiting film is formed around the thermally conductive materials (a sea-island structure in which the polymer phase forms a sea, and the thermally conductive material forms islands).

In this regard, when a polymer is fused and solidified in a state that a thermally conductive material is not sufficiently uniformly dispersed and mixed, thermal conduction paths are formed. However, since the polymer does not sufficiently penetrate into the thermally conductive material, a sea-island structure in which a portion of the polymer phase forms islands is formed, and mechanical properties such as strength of a molded article are markedly deteriorated. Even in this case, the advantages of organic polymers are not sufficiently manifested.

An object of the present invention is to solve this problem which is a contradictory tradeoff, and to provide a high filler-loaded high thermal conductive material which exhibits features of an organic polymer while ameliorating drawbacks thereof, enables integrated molding with ceramics, metals, semiconductor elements and the like, and has a low coefficient of thermal expansion and a high thermal conductivity; a method for producing the material; and a composition and a molded article thereof.

The inventors of the present invention repeated intensive investigations, in order to solve the problems described above, on the method for mixing and pulverization of a high thermal conductive filler and organic polymer particles, and the relationship between thermal conductivity and the degree of crystallization (heat of fusion) of a resin. As a result, the inventors found that when a composition which includes a high thermal conductive filler having a graphite structure and organic polymer particles, is obtained by a particular mixing-pulverization method, and is capable of forming a thermally conductive infinite cluster, is press molded under a predetermined pressure at a temperature higher than or equal to the deflection temperature under load, melting point, or glass transition temperature of the organic polymer, and the press-molded composition is cooled and solidified in a state of having the morphology maintained, crystallization of the polymer occurs along the plane of the graphite structure, and a high thermal conductive material having excellent properties as a result of intensive formation of thermal conduction paths is obtained. Thus, the inventors completed the present invention.

That is, the present invention solves the problem described above by the following means.

(1) A high filler-loaded high thermal conductive material, formed by subjecting a composition which includes organic polymer particles and a thermally conductive filler having a graphite-like structure, and includes 5 to 60% by weight of the organic polymer particles and 40 to 95% by weight of the thermally conductive filler having a graphite-like structure, relative to 100% by weight of the total amount of those components, is obtained, so that the thermally conductive filler is dispersed by delamination while maintaining the average planar particle size of the thermally conductive filler, and is capable of forming a thermally conductive infinite cluster; to press molding at a temperature higher than or equal to the deflection temperature under load, melting point or glass transition temperature of the organic polymer and at a pressure of 1 to 1000 kgf/cm$^2$; and then to cooling and solidification;

(2) the high filler-loaded high thermal conductive material according to (1), wherein a ball mill is used as the means for dispersing the thermally conductive filler by delamination while maintaining the average planar particle size of the thermally conductive filler;

(3) the high filler-loaded high thermal conductive material according to (1) or (2), wherein the organic polymer particles contain at least one selected from the group consisting of a thermoplastic resin, a thermoplastic elastomer, and an uncrosslinked thermosetting resin, all of which have crystallinity and/or aromaticity, and the thermally conductive filler having a graphite-like structure includes at least one selected from the group consisting of natural graphite, artificial graphite, and hexagonal boron nitride;

(4) the high filler-loaded high thermal conductive material according to (1) or (2), wherein the organic polymer particles are formed from at least one selected from the group consisting of a thermoplastic resin and a thermoplastic elastomer, and an uncrosslinked thermosetting resin all of which have crystallinity and/or aromaticity;

(5) the high filler-loaded high thermal conductive material according to (1) or (2), wherein the organic polymer particles are formed from at least one selected from the group consisting of a thermoplastic resin and a thermoplastic elastomer, both of which have crystallinity and/or aromaticity;

(6) the high filler-loaded high thermal conductive material according to any one of (1) to (5), wherein the average particle size of the organic polymer particles is 1 to 5000 μm, the average particle size of the thermally conductive filler having a graphite-like structure is 0.5 to 2000 μm, and the average particle size of the composition is 0.5 to 1000 μm;

(7) the high filler-loaded high thermal conductive material according to any one of (1) to (5), wherein the average particle size of the thermally conductive filler having a graphite-like structure is 3 to 200 μm, and the average particle size of the composition is 1 to 100 μm;

(8) the high filler-loaded high thermal conductive material according to any one of (1) to (7), wherein the thermally conductive filler having a graphite-like structure is natural graphite and/or artificial graphite, and has a thermal conductivity of 10 to 150 W/mK, a coefficient of thermal expansion of $3\times10^{-6}$ to $30\times10^{-6\circ}$ C.$^{-1}$, and a surface electrical conductivity of 5 to 250 (Ωcm)$^{-1}$;

(9) the high filler-loaded high thermal conductive material according to any one of (1) to (7), wherein the thermally conductive filler having a graphite-like structure is hexagonal boron nitride, and has a thermal conductivity of 5 to 50 W/mK, a coefficient of thermal expansion of $3\times10^{-6}$ to $30\times10^{-6\circ}$ C.$^{-1}$, and a surface electrical conductivity of $10^{-10}$ (Ωcm)$^{-1}$ or less;

(10) the high filler-loaded high thermal conductive material according to any one of (1) to (9), wherein the organic polymer includes at least one selected from the group consisting of polyphenylene sulfide, polyethylene terephthalate, polybutylene terephthalate, polycarbonate and benzoxazine, and the thermally conductive filler having a graphite-like structure includes scale-like graphite and/or hexagonal boron nitride;

(11) a method for producing a high filler-loaded high thermal conductive material, the method including:

(1) a step of preparing a composition which includes organic polymer particles and a thermally conductive filler having a graphite-like structure, includes 5 to 60% by weight of the organic polymer particles and 40 to 95% by weight of the thermally conductive filler having a graphite-like structure relative to 100% by weight of the total amount of those components, is obtained as the thermally conductive filler is dispersed by delamination while maintaining the average planar particle size of the thermally conductive filler, and is capable of forming a thermally conductive infinite cluster;

(2) a step of press-molding the composition at a temperature higher than or equal to the deflection temperature under load, melting point or glass transition temperature of the organic polymer and at a pressure of 1 to 1000 kgf/cm$^2$; and (3) a step of cooling and solidifying the material formed in the step (2);

(12) the method for producing a high filler-loaded high thermal conductive material according to (11), wherein a ball mill is used as the means for dispersing the thermally conductive filler by delamination while maintaining the average planar particle size of the thermally conductive filler;

(13) a high filler-loaded composition, capable of providing the high filler-loaded thermal conductive material according to any one of claims 1 to 10, or a high filler-loaded high thermal conductive material produced by the method according to (11) or (12);

(14) a coating liquid, including the high filler-loaded composition according to (13) and a dispersing medium;

(15) the coating liquid according to (14), wherein the dispersing medium includes an oil-soluble organic medium and a water-soluble organic medium.

(16) A molded article, containing the high filler-loaded high thermal conductive material according to any one of (1) to (10), a high filler-loaded high thermal conductive material obtainable by the production method according to (11) or (12), or a high filler-loaded high thermal conductive material obtainable by applying and solid-drying the coating liquid according to (14) or (15), and being used as a high thermal conductive and heat dissipation component;

(17) the molded article according to (16), wherein the molded article is formed by laminating two layers of the high filler-loaded high thermal conductive material; one layer of the two layers has a thermal conductivity of 15 to 120 W/mK and a coefficient of thermal expansion of $3\times10^{-6}$ to $30\times10^{-6}$ °C.$^{-1}$, and exhibits electrical conductivity with a surface electrical conductivity of 10 to 200 $(\Omega cm)^{-1}$; and the other layer of the two layers has a thermal conductivity of 5 to 50 W/mK or more and a coefficient of thermal expansion of $3\times10^{-6}$ to $10\times10^{-6}$ °C.$^{-1}$, and exhibits insulating properties with a surface electrical conductivity of $10^{-11}$ $(\Omega cm)^{-1}$ or less;

(18) the molded article according to (16) or (17), wherein the layers of the high filler-loaded high thermal conductive material are formed of a gradient material.

DESCRIPTION OF EMBODIMENTS

Figure 1:
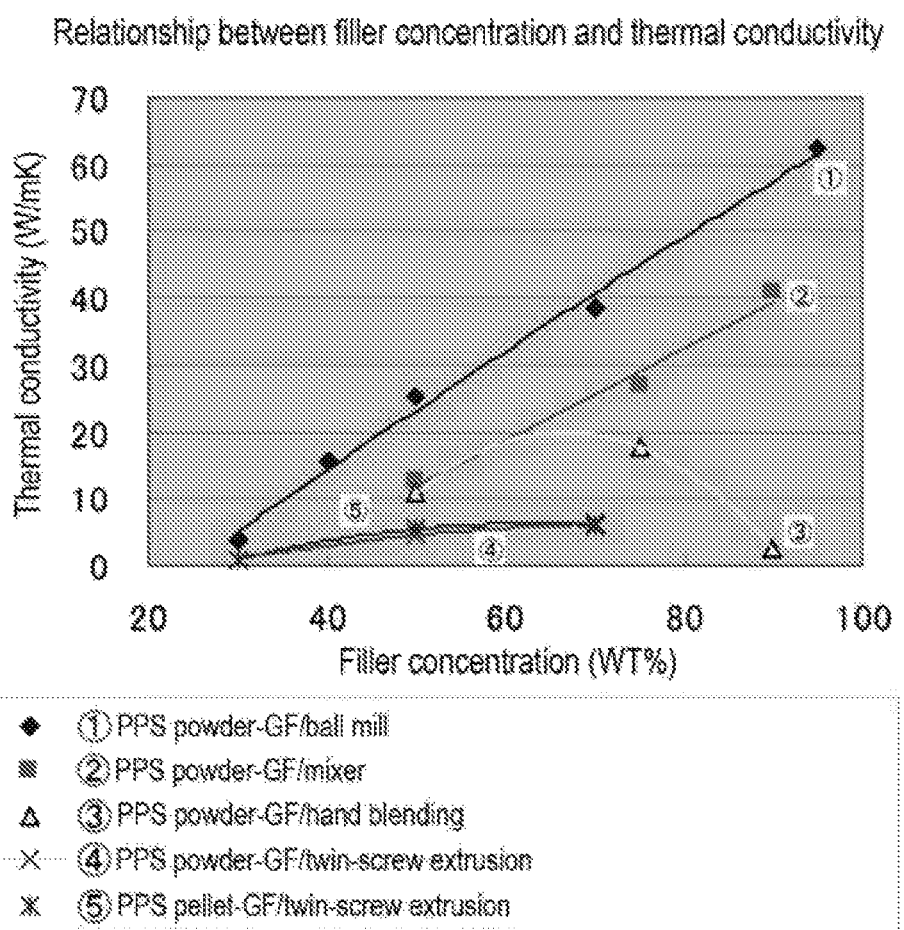
FIG. 1 is a graph illustrating the relationship between the filler concentration and the thermal conductivity.

Embodiments for carrying out the present invention will be explained in detail hereinbelow.

According to an embodiment of the present invention, there is provided a high filler-loaded high thermal conductive material, formed by subjecting a composition which includes organic polymer particles and a thermally conductive filler having a graphite-like structure, includes 5 to 60% by weight of the organic polymer particles and 40 to 95% by weight of the thermally conductive filler having a graphite-like structure (hereinafter, also simply referred to as "thermally conductive filler"), relative to 100% by weight of the total amount of these components, is obtained by a particular mixing/pulverization method, and is capable of forming a thermally conductive infinite cluster, to press molding at a temperature higher than or equal to the deflection temperature under load, melting point or glass transition temperature of the organic polymer and at a pressure of 1 to 1000 kgf/cm$^2$, and to cooling and solidification.

The high filler-loaded high thermal conductive material according to the present invention has a strongly entangled network of a high thermal conductive filler and an organic polymer established therein. Therefore, despite containing an organic polymer, the high filler-loaded high thermal conductive material is excellent not only in thermal conductivity, electrical characteristics, low thermal expandability, and mechanical properties, but is also excellent in light-weightness, easy processability, integrated moldability, durability against temperature cycle, and the like. That is, a high filler-loaded high thermal conductive material which sufficiently utilizes features of an organic polymer while ameliorating drawbacks, enables integrated molding with ceramics, metals, semiconductor elements and the like, and has a low coefficient of thermal expansion and a high thermal conductivity; a method for producing the same; a composition, a coating liquid, and a molded article can be provided.

<High Filler-Loaded High Thermal Conductive Material>

The high filler-loaded high thermal conductive material according to the present invention is a composite material containing an organic polymer and a thermally conductive filler having a graphite-like structure. At this time, the high filler-loaded high thermal conductive material is such that its configuration is determined by the stages of formation thereof, and it is not appropriate to characterize the material unambiguously by defining the organic polymer, the thermally conductive filler, and the like. The reason for this is that, for example, the high filler-loaded high thermal conductive material according to the present embodiment has a nature in which it is difficult to define the degree of penetration of the organic polymer into the thermally conductive filler, uniformity of the thermally conductive filer, and the like, as will be described below.

The thermal conductivity of the high filler-loaded high thermal conductive material according to the present embodiment is preferably 10 to 150 W/mK, more preferably 15 to 100 W/mK, and even more preferably 15 to 80 W/mK.

Furthermore, the coefficient of thermal expansion of the high filler-loaded high thermal conductive material according to the present embodiment is preferably $3\times10^{-6}$ to $30\times10^{-6}$ °C.$^{-1}$. According to an embodiment of the present invention, in the case of using the high filler-loaded high thermal conductive material in an application in which the material is brought into contact with a material having a smaller coefficient of thermal expansion, such as a semiconductor element or a ceramic substrate, the coefficient of thermal expansion is more preferably $3\times10^{-6}$ to $20\times10^{-6}$ °C.$^{-1}$. According to another embodiment of the present invention, in the case of using the high filler-loaded high thermal conductive material in an application in which the material is brought into contact with a heat dissipation component formed from a metal such as aluminum or copper, the coefficient of thermal expansion is more preferably $10\times10^{-6}$ to $30\times10^{-6}$ °C.$^{-1}$.

Furthermore, according to an embodiment of the present invention, the surface electrical conductivity of the high filler-loaded high thermal conductive electroconductive material (when the thermally conductive filler is graphite) according to the present embodiment is preferably 5 to 250 $(\Omega cm)^{-1}$, more preferably 10 to 150 $(\Omega cm)^{-1}$, and even more preferably 20 to 150 $(\Omega cm)^{-1}$.

Moreover, according to another embodiment of the present invention, the thermal conductivity of the high filler-loaded high thermal conductive insulating material (when the thermally conductive filler is hexagonal boron nitride) is preferably 5 to 50 W/mK. Also, the surface electrical conductivity is preferably $10^{-10}$ $(\Omega cm)^{-1}$ or less, and more preferably $10^{-15}$ to $10^{-11}$ $(\Omega cm)^{-1}$.

[Composition]

(Contents of Components and Figures)

The composition used for the formation of the high filler-loaded high thermal conductive material includes organic polymer particles and a thermally conductive filler having a graphite-like structure, and includes 5 to 60% by weight of the organic polymer particles and 40 to 95% by weight of the thermally conductive filler having a graphite-like structure (thermally conductive filler) relative to 100% by weight of the total amount of these components. At this time, the composition is obtained so that the thermally conductive filler is dispersed by delamination while maintaining the average planar particle size of the thermally conductive filler. Also, the composition meets the conditions for forming a thermally conductive infinite cluster. Furthermore, known additives may also be added to the composition as necessary.

The thermally conductive filler having a graphite-like structure is in the form of particles having a layered structure, and is an anisotropic material in which the materials in the layers are connected by strong bonding in the plane direction of the layers, and are connected by weak bonding between the layers. Since the thermally conductive filler having a graphite-like structure is likely to be shifted in the planar direction, the filler can be used as a lubricating/mold releasing material. Here, the term "delamination" means that detachment occurs between layers that are connected by weak bonding, while the state of connection in the planar direction of the thermally conductive filler is maintained unchanged. Thereby, the average planar particle size of the thermally conductive filler can be maintained, and the thermally conductive filler can be dispersed in the composition. Meanwhile, in the present specification, the "planar particle size" means the particle size in the planar direction of a particle having a layered structure, and the "average planar particle size" means the average value of the planar particle sizes in the planar direction. For the average planar particle size, values measured by an image analysis with optical microscopy, electron microscopy and the like will be employed. Also, according to the present specification, the phrase "the average planar particle size is maintained" means that the degree of reduction of the average planar particle size is ½ or less.

Furthermore, the term "infinite cluster" is based on the percolation theory, and in general, the "percolation theory" is a theory on how an object substance is connected in a system, and how the features of the connection are reflected in the nature of the system. Specifically, when the filler particles are sufficiently brought into contact with one another to reach the percolation (penetration) threshold, the filler particles are aggregated to a concentration higher than or equal to a particular concentration (threshold) of the electrically conductive filler to form a cluster in which the entire system stretches out (infinite cluster). Then, electrical conductivity is exhibited over the entire system.

In the present invention, it was found that the figure such as crystallinity and compatibility of the organic polymer that exists in the vicinity of the thermally conductive filler particularly largely affects not only electrical conductivity, but also thermal conductivity and thermal expandability. Meanwhile, it is contemplated that the percolation threshold depends on the concentration and shape of the thermally conductive filler, the state of mixing with the organic polymer particles, and the state of bonding between the thermally conductive filler particles. However, electrical conductivity is strongly affected by the shape of the filler or polarity of the resin as compared with thermal conductivity, and thereby, electrical conductivity is more sensitive.

According to the present embodiment, the composition meets the conditions for forming a thermally conductive infinite cluster, and these conditions can be realized by controlling the contents of the organic polymer particles and the thermally conductive filler in the composition, and uniform dispersibility, shape, morphology and the like of the respective components.

Whether the composition according to the present embodiment meets the conditions for forming an infinite cluster is determined as follows. That is, in regard to the composition described above, the issue can be directly determined by forming a high filler-loaded high thermal conductive material by a method described below, and observing the microstructure of the high filler-loaded high thermal conductive material using a scanning electron microscope (SEM) or a transmission electron microscope (TEM). Furthermore, the issue can be indirectly determined from a exponential increase in the physical properties when the thermal conductivity and/or electrical conductivity of the material is/are plotted, or from the controllability of the coefficient of thermal expansion of the material when the coefficient of thermal expansion is plotted.

(Organic Polymer Particles)

The average particle size of the organic polymer particles used in the present invention is usually 1 to 5000 μm, and preferably 5 to 500 μm. When the average particle size of the organic polymer particles is 1 μm or more, no special apparatus for micronization is needed. On the other hand, when the average particle size of the organic polymer particles is 5000 μm or less, defective dispersion is not likely to occur. Organic polymer particles including lumpy objects having a large particle size can be used after being pretreated in advance by pulverization and/or crushing, classification and the like to obtain a desired average particle size.

The organic polymer particles preferably have an aromatic hydrocarbon structure similar to the thermally conductive filler having a graphite-like structure, and it is particularly preferable to crystallize the organic polymer around the filler particles in the presence of the filler, along the planar direction of the filler.

Examples of the organic polymer particles that can be used include thermoplastic resins having crystallinity and/or aromaticity thermoplastic polymers, uncrosslinked elastomers, and thermosetting polymers being uncured thermosetting resins, all of which are used in the field of molding.

Examples of crystalline aromatic thermoplastic resins include known thermoplastic polymers having crystallinity and aromaticity, such as aromatic polyesters such as polyethylene terephthalate (PET), polybutylene terephthalate (PBT), polytrimethylene terephthalate (PTT), polyethylene naphthalate (PEN), and liquid crystal polyester (LCP); polyphenylene sulfide (PPS), aromatic polyimide (PI) precursors, phenol (novolac type and the like) phenoxy resins, polyether ketone (PEK), polyether ether ketone (PEEK), polystyrene, polybenzimidazole, and polyphenylene oxide. These resins are particularly preferable because the resins can strongly fix the filler particle between filler particles due to the crystalline of the polymer grown onto the filler surface, and/or compatibility with the filler; electrical conductivity or insulating properties, and thermal conductivity can be markedly increased without significantly impairing mechanical properties; and the coefficient of thermal expansion can be appropriately controlled.

Examples of crystalline thermoplastic resins include known thermoplastic polymers having crystallinity, such as polyolefins such as polyethylene (PE) and polypropylene (PP); polyoxymethylene (POM), polyamide (PA), polymethyl methacrylate (PMMA), polyvinyl chloride (PVC), polyvinylidene chloride, polyketone (PK); fluororesins such as polytetrafluoroethylene (PTFE); cycyloolefin polymers, polyacetal, and ultrahigh molecular weight polyethylene. These resins are preferable because the resins can fix the filler particle between filler particles through crystallization of the polymers grown onto the filler surfaces, electrical conductivity or insulating properties, and thermal conductivity can be increased without impairing mechanical properties, and the coefficient of thermal expansion can be controlled.

Examples of non-crystalline aromatic thermoplastic resins include known thermoplastic polymers having aromatic substituents, such as polycarbonate (PC), polyphenylene ether (PPE), polyallylate (PA), polysulfone (PSU), polyether sulfone (PES), polyether imide (PEI), polyamideimide (PAI), and liquid crystal polymers. Since these resins have a structure similar to that of thermally conductive fillers, the resins are crystallized, in the presence of a thermally conductive filler, on the surface and/or in the vicinity of the thermally conductive filler, or even if crystallization is not attained as a whole system, the resins have high compatibility with the thermally conductive filler having a similar structure. Therefore, the resins are preferable because they can increase the electrical conductivity or insulating properties and thermal conductivity and can control the coefficient of thermal expansion without significantly impairing mechanical properties, by fixing the filler particle between filler particles on the surface and/or in the vicinity of the filler. It is preferable to use uncured thermosetting resins in combination with the thermoplastic resins described above, rather than to use alone, from the viewpoints of adjusting the viscosity upon melting, or increasing the adhesiveness/compatibility between filler particles or between different kinds of materials.

Examples of uncrosslinked elastomers include known elastomers, such as thermoplastic elastomers having aromatic substituents and/or crystalline olefin moieties, such as polystyrene-based, polyolefin-based, polyurethane-based, polyester-based, polyamide-based, polybutadiene-based, polyisoprene-based, silicone-based, and fluorine-based elastomers; and thermoplastic elastomers having aromatic substituents and/or crystalline olefin moieties, including graft copolymers containing olefin-based polymer segments formed from α-olefin monomers and vinyl-based polymer segments formed from vinyl-based monomers.

Examples of uncured thermosetting resins include known thermosetting resin precursors, such as unsaturated polyesters, vinyl esters, epoxies, phenols (resol type), urea/melamine, polyimide, benzoxazine, all of which have aromatic substituents. Since the thermosetting resin precursors are usually oligomers having small molecular weights, when the precursors are used in combination with thermoplastic polymers and/or thermoplastic elastomers having large molecular weights, fluidity in the system is increased before curing, thereby increasing penetrability of the polymer in between the filler layers. Furthermore, adhesiveness between filler particles or between different kinds of materials is enhanced by the functional groups formed along with the curing reaction. In addition, when the precursors are used in combination with engineering plastics having high melting points, the molding temperature can be decreased significantly. At this time, it is more effective to use a product obtained by uniformly dispersing a thermosetting resin precursor in a solvent in which an engineering plastic is dissolved once.

Figure 7:
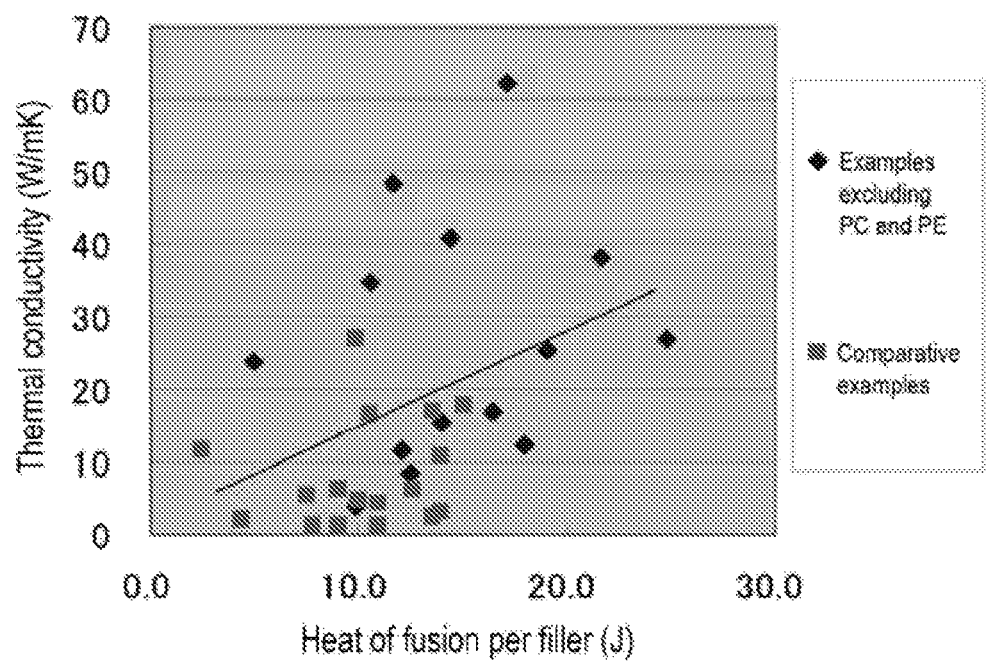
FIG. 7 is a graph illustrating the relationship between the heat of fusion per filler and the thermal conductivity.

Whether the composition meets the conditions for forming an infinite cluster, that is, whether the organic polymer establishes, in the presence of a thermally conductive filler, a partially crystalline structure around the filler particles, and the composition forms a thermally conductive infinite cluster based on the thermally conductive filler, can be directly observed using electron microscopy such as scanning electron microscopy (SEM) or transmission electron microscopy (TEM) as described above. Furthermore, the issue can be indirectly determined by measuring the heat of fusion of a molded specimen. For example, FIG. 7 illustrates the relationship between the thermal conductivities of aromatic crystalline resins excluding polycarbonate and polyethylene, and the heat of fusion per filler. According to FIG. 7, it is understood that the thermal conductivity increases along with an increase in the heat of fusion per filler. Regarding a polycarbonate, which is an aromatic non-crystalline resin, a molded specimen does not exhibit any melting point if not aged, and has a small heat of fusion; however, a polycarbonate obtained immediately after a condensation reaction exhibits a heat of fusion of the same level as that of an aromatic crystalline resin. That is, it is speculated that in the filler surface having a graphite-like structure, which induces crystallization of a resin, crystallization occurs at a high level, and a high thermal conductivity will be exhibited. It can be said that the same applies to thermosetting resin precursors such as benzoxazine. Polyethylene is not an aromatic resin; however, since polyethylene exhibits high heat of fusion, it is speculated that polyethylene may provide a thermal conductivity close to that of an aromatic resin. As such, crystallization of a resin around filler significantly affects the thermal conductivity of the material. It is essential for the organic polymer particles used in the present invention to be crystallized in the raw material and/or a molded article, and it is necessary for the organic polymer particles to present the heat of fusion in any form.

The thermoplastic resin, uncrosslinked elastomer and uncured thermosetting resin, described above, all of which have crystallinity and/or aromaticity as described above, may be copolymers or modification products, and may also be a resin obtained by blending two or more kinds thereof. Furthermore, for an enhancement of impact resistance, a resin obtained by adding an elastomer or a rubber component to the thermosetting resin may also be used.

Among these thermosetting resins, particularly benzoxazine has excellent thermal resistance, and since curing proceeds as a result of an addition reaction, volatile side products are not generated. Further, the reaction also proceeds in the absence of catalyst, and a uniform and compact resin phase can be formed, which is preferable.

The benzoxazine described above is a compound having a dihydro-1, 3-benzoxazine ring (hereinafter, also simply referred to as "oxazine ring"), and is a condensate of amines, phenols, and formaldehydes. Usually, the chemical structure of benzoxazine produced is determined by the substituents, kinds and the like of phenols, amines and the like, which are reaction raw materials thereof. The benzoxazine used in the present invention may be any derivative of an "oxazine ring", and is not particularly limited; however, a compound having at least two oxazine rings in one molecule is preferred. This is because the crosslinking density is increased, and superior results such as an enhancement of thermal resistance are obtained. Specific examples of benzoxazine include Pd type benzoxazine and Fa type benzoxazine, manufactured by Shikoku Chemicals Corp.

Regarding the amines for deriving benzoxazine having at least two oxazine rings, diamines can be used. Examples of the diamines include 4,4'-oxydianiline, 4,4'-diaminodiphenylmethane, para-diaminobenzene, and compounds obtained by substituting the foregoing compounds with an alkyl group, an alkoxy group, a halogen, an aromatic hydrocarbon group and the like. Among these, it is preferable to use 4,4'-diaminodiphenylmethane.

Examples of phenols include, as monovalent phenols, phenol, cresol, xylenol, and naphthol; and as polyvalent phenols, bisphenol; and compounds obtained by substituting the foregoing compounds with an alkyl group, an alkoxy group, a halogen, an aromatic hydrocarbon group, and the like. Specific examples of bisphenol include bisphenol A, bisphenol F, and bisphenol S. Among these, it is preferable to use phenol and bisphenol.

Regarding formaldehydes, formaldehyde (aqueous solution), para-formaldehyde and the like are used. Among these, it is preferable to use formaldehyde.

In order to obtain benzoxazine from the amines, phenols, and formaldehydes described above, a wide variety of known methods can be employed.

A benzoxazine having at least two oxazine rings can be produced by a method of allowing a diamine, a phenol, and a formaldehyde to react; a method of allowing a bisphenol, a primary amine, and a formaldehyde to react; or the like.

The organic polymer particles formed from a thermoplastic resin, a thermoplastic elastomer or a thermosetting resin are uncrosslinked/uncured particles in the mixture. As will be described, when the mixture is heated and molded under pressure, the thermoplastic resin may be crosslinked, and the thermoplastic elastomer or thermosetting resin before being crosslinked/cured is usually used.

Examples of the elastomer used for the purpose of modification include natural rubber, isoprene rubber, styrene-butadiene rubber, butadiene rubber, chloroprene rubber, nitrile rubber, butyl rubber, ethylene-propylene rubber, urethane rubber, silicone rubber, acrylic rubber, chlorosulfonated polyethylene rubber, fluorine rubber, hydrogenated nitrile rubber, epichlorohydrin rubber, and polysulfide rubber.

Among these organic polymer particles, for organic polymer particles that have high thermal resistance, strongly fix the filler particle between filler particles, and enhance various physical properties such as heat conductivity and electrical characteristics, polyethylene terephthalate, polybutylene terephthalate, polyphenylene sulfide, polycarbonate, and benzoxazine are suitable. When the various polymer particles described above are used in combination in accordance with the purpose of use, the features of organic polymers can be manifested at the maximum.

(Thermally Conductive Filler Having Graphite-Like Structure)

The thermally conductive filler used in the present invention has a graphite-like structure. Regarding the thermally conductive filler, known thermally conductive fillers which are used in the field of molding and are formed from black leads (synonym for graphite) that usually have electrical conductivity, such as natural graphite such as scale-like graphite, bulk graphite and soil graphite, artificial graphite, and expanded graphite; thermally conductive ceramics that usually have insulating properties, such as hexagonal boron nitride, hexagonal silicon carbide, and hexagonal silicon nitride; and mixtures thereof, can be used without any particular limitations. Among these, scale-like graphite and hexagonal boron nitride are particularly preferred because they produce high thermal conductive materials having high electrical conductivity or high insulating properties, respectively.

Regarding the black leads, furthermore, a product obtainable by pulverizing an artificial graphite electrode, a product obtainable by graphitizing powdered cokes by a heat treatment at 3000° C., a product obtainable by cutting and pulverizing a graphite sheet, a graphite powder obtainable by making scale-like graphite into a spherical form, and a recycled product obtainable by heat treating carbon fibers that have been used or has become a waste material, can also be used.

Natural graphite is originally a mineral produced as ancient creatures and plants are buried in the earth and denatured under the effect of ground heat or ground pressure for a long time before being putrefied and decomposed, as in the cases of petroleum and coal. The element that constitutes the majority of natural graphite is carbon, but silicon dioxide, aluminum oxide and the like are included therein in trace amounts as other impurities. Examples of the natural graphite include scale-like graphite, bulk graphite, and soil graphite.

The scale-like graphite is scale-shaped graphite produced mainly from mines in China, the United States, India, Brazil and the like and having a large aspect ratio, and in general, larger scales are associated with higher thermal resistance. Graphite having an average particle size of about 8 to 200 µm and a carbon content of 85 to 99% is frequently sold in the market, and this graphite is anisotropic but has a high thermal conductivity of 200 W/mK or more.

Bulk graphite is a natural graphite in a bulk state produced in Sri Lanka, and bulk graphite is produced from a mineral vein having a content of about 95%, compared with scale-like graphite whose content in rocks is ten-several %. Since the particles are bulky, the aspect ratio is small.

Soil graphite is clod-like graphite produced mainly in China, South Korea and North Korea, and is used in many fields because soil graphite has high affinity with moisture compared with scale-like graphite. A graphite having an average particle size of about 5 to 20 µm and a carbon content of 80 to 90% is commercially available.

Artificial graphite is a graphite obtained by molding a mixture of powdered cokes and pitch, and artificially developing crystals through a high temperature calcination process at about 3000° C., and this graphite has fewer impurities and high hardness.

Expanded graphite is a graphite obtained by applying heat to acid-treated scale-like graphite to expand graphite crystals between layers to several hundred times. Since expanded graphite has a very low specific gravity while having the characteristics of scale-like graphite, and has fewer impurities, expanded graphite is used as filler in various fields.

Hexagonal boron nitride is a white powder having a scale-like crystal structure resembling graphite, and is a chemically stable material called "white graphite". Hexagonal boron nitride is a material having excellent thermal conductivity, thermal resistance, corrosion resistance, electrical insulating properties and lubricating/mold releasing properties, and is widely used as an additive material in various matrices. Thus, known materials can be used as received. A scale-like form or a polygonal plate form is generally used, and there are also available aggregate powders in which primary particles are compositely aggregated; however, hexagonal boron nitride of scale-like form is preferred. Although the substance is anisotropic, a molded body thereof has a high thermal conductivity of about 60 W/mK.

Silicon carbide can be roughly divided into two kinds such as hexagonal α-type silicon carbide and cubic β-type silicon carbide. Silicon carbide is electrically insulating and has high hardness and a high thermal conductivity, and thus, application thereof as a structural material utilizing high hardness is underway, in addition to application as a heat generator or a varistor utilizing semiconductivity. These basic layer structures adopt a closest packed structure and are distinguished by the difference in the period of stacking of layers. Among these, the β-type silicon carbide is limited to one kind of sphalerite (zinc blende) structure in which a half of carbon (C) in the diamond structure is substituted by silicon (Si). On the other hand, the α-type silicon carbide is based on a wurtzite (wurtzite) type crystal structure. The α-type crystal structure of silicon carbide can be described as stacking of a basic layer structure spread along the bottom surface, and is preferable as the thermally conductive filler used in the present invention.

Silicon nitride is a colorless compound, and only silicon nitride having a composition of $Si_3N_4$ is considered as a stable phase. There are three kinds of forms such as α-type of hexagonal crystal, β-type of trigonal crystal, and amorphous form. Amorphous silicon nitride is produced at a relatively low temperature, and the composition is not always constant. The amorphous type is converted to the α-type when heated. The α-type is a low temperature phase and is irreversibly transferred to the β-type at 1400° C. to 1600° C. The β-type is stable up to high temperatures, but is thermally decomposed at 1800° C. to 1900° C. Silicon nitride is a very hard material having excellent sliding properties and also having excellent thermal resistance and corrosion resistance, and exhibits superior performance in various abrasion resistance members, sliding members, high temperature structural members, and corrosion resistance members. Furthermore, silicon nitride has high thermal conductivity that is greater than or equal to that of iron, and can also be imparted with electrical conductivity depending on the composition. Therefore, silicon nitride is a very unique high-tech ceramic which can be applied to various functional members. For the thermally conductive filler used in the present invention, the α-type of hexagonal crystal is preferred.

The average particle size of the high thermally conductive filler having a graphite-like structure of the present invention is 1 to 2000 μm, and preferably 3 to 200 μm. When the average particle size of the thermally conductive filler is 1 μm or more, the surface area is decreased, and the loss of heat and electrical conduction at the filler interface can be reduced. On the other hand, when the average particle size of the thermally conductive filler is 2000 μm or less, it is preferable because defective dispersion is not likely to occur.

For a filler including lumpy objects having large particle sizes, it is preferable to use the filler after pretreating the filler in advance by pulverization and/or crushing, classification and the like, and adjusting the particles to a desired average particle size. Combined use of thermally conductive fillers having different particle sizes, and known methods for promoting an increase in thermal conductivity by controlling the filler shape can also be used.

(Method for Preparing Composition)

The composition according to the present embodiment can be prepared by mixing, after crushing if needed, 5 to 60% by weight of organic polymer particles and 40 to 95% by weight of a thermally conductive filler having a graphite-like structure. However, when the materials are mixed using an excessively large force, particle size reduction occurs; for this reason, the surface area of the thermally conductive filler increases significantly, and inhibition of thermal conduction occurs at the particle interfaces, which is not preferable. Thus, in the present embodiment, it is preferable to mix the materials by a method of uniformly dispersing the thermally conductive filler in the composition while maintaining the average planar particle size of the thermally conductive filler. An example of the mixing method may be a method of using delamination. Meanwhile, the composition may include known additives in addition to the organic polymer particles and the thermally conductive filler.

Examples of the method of mixing the organic polymer particles, the thermally conductive filler and the like include a method of introducing the materials into a bag or a can and manually mixing the materials; a method of using a tumbler or the like; a method of using a powder mixing machine such as a Henschel mixer, a Super mixer, or a high-speed mixer; a method of using a pulverizing machine such as a jet mill, an impact mill, an attrition mill, an air classification (ACM) mill, a ball mill, a roller mill, a bead mill, a medium mill, a centrifuge mill, a cone mill, a disc mill, a hammer mill, or a pin mill; and methods combining these.

The method of manually mixing or the method of using a tumbler does not involve large force such as shear force between the powder particles, and therefore can prevent damage or deformation of powder. However, from the viewpoint of eliminating vacant spaces (voids) between the filler particles (therefore, the density is increased) by sufficiently uniformly mixing the respective fine particles of the organic polymer particles and the thermally conductive filler, and allowing the organic polymer to sufficiently penetrate between the filler particles, and thereby forming a thermally conductive infinite cluster sufficiently, it is preferable to carry out the mixing by methods other than the method of manual mixing and a method of using a tumbler.

The method of using a mixing machine and/or a pulverizing machine is capable of uniform mixing because large forces such as compressive force, shear force, impact force and frictional force are applied to powder particles, and is preferable for the present invention. Among these mixing machines and/or pulverizing machines, it is preferable to use a ball mill. A ball mill is an apparatus for producing a powder dispersed by grinding down a material adhering to ball surfaces using frictional force or impact force, by introducing hard balls made of a ceramic or the like and powders of materials into a cylindrical vessel, and rotating the vessel. Therefore, dispersion can be achieved by delamination while maintaining the planar particle size of the filler layers as far as possible. As a result, the ball mill is particularly preferable for mixing and/or pulverization of the thermally conductive filler of the present invention having a layered structure. For example, FIGS. 9 to 12 show scale-like graphite and short carbon fibers used as raw materials, and SEM photographs of compositions obtained by mixing these fillers with PPS by a ball mill. Scale-like graphite having a layered structure almost maintains the particle size of the raw materials even after being pulverized and mixed with a ball mill, and exhibits a high thermal conductivity. However, in the case of short carbon fiber having a rod shape, particle size reduction occurs to markedly decrease the thermal conductivity.

It is not particularly necessary to strictly control the size or shape of the raw materials used at the time of mixing and pulverization; however, it is preferable to use a size or shape in a preliminarily determined range in order to maintain the product quality.

The mixing time is not particularly limited, but the mixing time is preferably 0.2 to 15 hours, and more preferably 0.5 to 5 hours.

Furthermore, the average particle size of a uniform composition (organic polymer particles and a thermally conductive filler) obtained by mixing and/or pulverization is preferably 0.5 to 1000 μm, and more preferably 1 to 500 μm. When the average particle size of the composition is 0.5 μm or more, the contact area between filler particles is decreased as a result of a decrease in the surface area to prevent deterioration of thermal conductivity and electrical characteristics caused by the loss induced by contact. On the other hand, when the average particle size of the composition is 1000 μm or less, the resin is uniformly dispersed to prevent a decrease in strength caused by defective contact between the resin and the filler.

For the measurement of the average particle sizes of the organic polymer particles and the thermally conductive filler used as raw materials, and of the organic polymer particles and the thermally conductive filler in the composition, known methods such as a dynamic light scattering method, a laser diffraction method, an imaging method using optical microscopy/electron microscopy, and a gravity sedimentation method can be used. Furthermore, the level of delamination can be directly determined by optical microscopy or electron microscopy, or can be indirectly determined by measuring the thermal conductivity, electrical conductivity, coefficient of thermal expansion, mechanical properties and the like of the material.

The proportion of the organic polymer particles in the composition of the present invention is 5 to 60% by weight, and preferably 10 to 50% by weight. If the proportion of the organic polymer particles is less than 5% by weight, a decrease in strength caused by defective dispersion of the thermally conductive filler, or the like occurs. On the other hand, the proportion of the organic polymer particles is more than 60% by weight, thermal conduction paths are not easily formed (the percolation threshold is not reached), and this leads to a rapid decrease in thermal conductivity (however, even in a case in which the proportion of the organic polymer particles is 60% by weight or less, an infinite cluster may not be formed depending on the state of mixing or the like).

On the other hand, the proportion of the thermally conductive filler in the composition is 40 to 95% by weight, and preferably 50 to 90% by weight. If the proportion of the thermally conductive filler is less than 40% by weight, a thermally conductive infinite cluster is not easily produced, and significant deterioration of physical properties such as thermal conductivity, electrical characteristics and low thermal expandability occur, which is not preferable. On the other hand, if the proportion of the thermally conductive filler is more than 95% by weight, defective dispersion of the thermally conductive filler occurs to markedly deteriorate mechanical properties such as strength, which is not preferable.

In the composition of the present invention, known additives, reinforcing agents, and/or fillers can be appropriately used as necessary, to the extent that the addition does not cause contradiction to the purpose of the present invention. Examples of the additives include a mold releasing agent, a flame retardant, an oxidation inhibitor, an emulsifier, a softening agent, a plasticizing agent, a surfactant, a coupling agent, and a compatibilizer. Examples of the reinforcing materials include short fibers formed from glass fiber, carbon fiber, metal fibers, and inorganic fibers. Examples of other fillers include calcium carbonate (limestone), glass, talc, silica, mica, metal powders, metal oxides, aluminum nitride, boron nitride, silicon nitride, diamond, and recycled products obtainable by heat treating carbon fiber that has been used or has become a waste material.

[Press Molding of Composition, Cooling and Solidification]

The high filler-loaded high thermal conductive material of the present invention can be obtained by press molding the composition described above at a temperature higher than or equal to the deflection temperature under load, melting point or glass transition temperature of the organic polymer and at a pressure of 1 to 1000 kgf/cm$^2$, and cooling and solidifying the material thus obtained. Meanwhile, when a vacuum is applied or pressure is reduced inside the mold at the time of hot press molding, air or gas bubbles included in the raw material composition inside the mold, or the gas bubbles generated at the time of press molding can be eliminated, and various physical properties such as thermal conductivity of the molded article can be enhanced, which is preferable.

The press molding can be carried out using known hot pressing methods such as compression molding using a mold, and sheet molding using hot rolls. At this time, it is necessary to use a raw material composition that is not melt mixed, and to melt the raw material composition inside a mold or by roll heating, whereby the thermally conductive filler can be impregnated by molten polymer. Also, the organic polymer can be crystallized by cooling and solidification to form thermal conduction paths at a high level between the thermally conductive fillers.

The pressure of the press molding is 1 to 1000 kgf/cm$^2$, and preferably 10 to 500 kgf/cm$^2$. When the pressure of the press molding is 1 kgf/cm$^2$ or less, voids are not eliminated, and a compact molded article cannot be obtained. On the other hand, when the pressure of the press molding is 1000 kgf/cm$^2$ or more, the liquefied or softened polymer leaks through gaps of the mold, and mold release is not easily achieved.

Here, the differences between a raw material, a composition, a material and a molded article are such that the raw material is a crude material; the composition is an indeterminately shaped raw material mixture (powder) in which various raw materials are uniformly dispersed and mixed; a material is an indeterminately shaped solid obtainable from the composition and is not limited in shape; and the molded article refers to a solid having a certain shape.

When the composition is heated at a temperature higher than or equal to the deflection temperature under load, melting point or glass transition temperature of the organic polymer, the organic polymer particles can be liquefied or softened. Thereby, the liquefied or softened polymer can be caused to infiltrate itself into the gaps between one filler particle and another filler particle, and a phase A formed from only the organic polymer and a phase B containing the filler as a main component are entangled, so that the phase B forms a three-dimensional network structure. Since the thermally conductive filler concentration is higher than or equal to the percolation threshold, the thermally conductive fillers are in sufficient contact with each other on the layer end faces of the thermally conductive filler, and the thermally conductive filler exists as a cluster spreading over the entire system. In a cooling stage, cold from the outside starts to cool the phase B containing the filler that has significantly high thermal conductivity, and then causes solidification and/or crystallization of the polymer in the surroundings. Thus, efficient solidification/immobilization around the fillers occurs.

In particular, since the filler having a graphite structure and an aromatic crystalline resin as a preferred organic polymer have similar structures, crystallization proceeds along the layer surface. Then, by covering the surroundings of the filler layers by the crystal structure of the polymer, the gaps between the filler layer end faces that are considered to be filled with non-crystalline polymer are immobilized in a sufficiently compactly contacting manner, and thus thermal conduction paths can be formed at a high level.

Regarding the temperature at the time of press molding, the melting point is used for a crystalline polymer, the glass transition temperature is used for a non-crystalline polymer, and when the melting point or glass transition temperature is not defined or absent, the deflection temperature under load is used as the measure, while a temperature higher than or equal to those is used. Meanwhile, the deflection temperature under load, melting temperature and glass transition temperature differ depending on the kind of the organic polymer used.

Next, the material obtained by press molding is cooled and solidified.

The cooling temperature is not particularly limited, but it is a temperature at which the organic polymer is solidified, where the melting point, glass transition temperature and deflection temperature under load of the organic polymer are taken as a reference. The cooling temperature is preferably 0 to 100° C., and more preferably 10 to 50° C.

Furthermore, the cooling time is not particularly limited, but is preferably 0.05 to 3 hours, and more preferably 0.5 to 1.5 hours.

The degree of crystallization of the organic polymer can be determined by taking the heat of fusion obtainable using a differential scanning calorimeter (DSC), as an indicator. The degree of crystallization of a thermally conductive filler-containing organic polymer can be represented as the heat of fusion per resin and the heat of fusion per filler; however, the former usually decreases as the thermally conductive filler concentration increases. This is because it is predicted that along with an increase in the thermally conductive filler concentration, an amorphous polymer exists in a large amount between the thermally conductive filler layer end faces where crystallization is not likely to occur. The heat of fusion per filler is the heat of fusion per resin corresponding to the parts by weight of the filler, and is the effective amount of the heat of fusion (crystal) that contributes to the thermal conductivity. Even for an organic polymer which is classified as an amorphous organic polymer, if the raw material powder before molding has the heat of fusion (when polymerization from a monomer to a polymer proceeds, an optimal structure that is likely to be crystallized can be reasonably adopted), rearrangement of molecules occurs as a result of annealing, and the organic polymer manifests the heat of fusion. That is, this implies that even for a polymer which is classified as an amorphous organic polymer, if the polymer has aromatic groups, crystallization occurs on the thermally conductive filler surface having a graphite-like structure, and the gaps between the thermally conductive filler layer end faces can be immobilized.

<Method for Producing High Filler-Loaded High Thermal Conductive Material>

According to an embodiment of the present invention, a method for producing a high filler-loaded high thermal conductive material is provided. This production method includes: (1) a step of preparing a composition which includes organic polymer particles and a thermally conductive filler having a graphite-like structure, includes 5 to 60% by weight of the organic polymer particles and 40 to 95% by weight of the thermally conductive filler having a graphite-like structure, relative to 100% by weight of the total amount of these components, is obtained so that the thermally conductive filler is dispersed by delamination while maintaining the average planar particle size of the thermally conductive filler, and is capable of forming a thermally conductive infinite cluster; (2) a step of press molding the composition at a temperature higher than or equal to the deflection temperature under load, melting point or glass transition temperature of the organic polymer and at a pressure of 1 to 1000 kgf/cm$^2$; and (3) a step of cooling and solidifying the material formed in the step (2).

For the above described steps (1) to (3), the above-described method can be appropriately employed.

<High Filler-Loaded Composition>

According to an embodiment of the present invention, a high filler-loaded composition as a powder mixture is provided. This high filler-loaded composition provides the high filler-loaded high thermal conductive material mentioned above. In addition to that, the composition may also include the above-mentioned known additives, reinforcing agents and/or fillers, for example, a mold releasing agent, a flame retardant, an oxidation inhibitor, an emulsifier, a softening agent, a plasticizing agent, a surfactant, a coupling agent, a compatibilizer; short fibers formed from glass fiber, carbon fiber, metal fibers inorganic fibers; calcium carbonate (limestone), glass, talc, silica, mica, metal powders, metal oxides, aluminum nitride, boron nitride, silicon nitride, diamond, and recycled products obtainable by heat treating carbon fiber that has been used or has become a waste material. In regard to the high filler-loaded composition, the descriptions related to the composition described above are appropriately applied.

<Coating Liquid>

According to another embodiment of the present invention, a coating liquid is provided. This coating liquid also provides the high filler-loaded high thermal conductive material described above. The coating liquid includes a high filler-loaded composition and a dispersing medium. This coating liquid can produce a uniform film or coating layer of a high thermal conductive material having a film thickness of 10 mm or less by applying the coating liquid on a substrate, and then removing the dispersing medium using a means such as heating or pressure reduction. The coating liquid can also be utilized as an adhesive.

Examples of the dispersing medium include water (boiling point: 100° C.) media; oil-soluble organic media such as methyl ethyl ketone (boiling point: 80° C.), toluene (boiling point: 111° C.), phenol (boiling point: 182° C.), and tetralin (boiling point: 207° C.); water-soluble organic media such as t-butanol (boiling point: 82° C.) and ethylene glycol (boiling point: 196° C.); and medium mixtures thereof.

The boiling point of the dispersing solvent used is preferably 70° C. to 200° C. When the boiling point is 70° C. or higher, there is no risk of fire caused by evaporation of the dispersing solvent, or aggravation of the work environment. When the boiling point is 200° C. or lower, a significant decrease in the thermal conductivity caused by residual dispersing medium can be prevented.

In the case of using a water medium, since aggregation or separation of the high filler-loaded composition can easily occur, dispersion stabilizers such as an emulsifier and a dispersant are usually used. Since many of these dispersion stabilizers adversely affect the physical properties such as electrical characteristics and thermal conductivity, it is preferable to use an organic medium having satisfactory dispersion stability. Regarding the cautions to be taken in the case of using an organic medium, when a dispersing medium and/or dispersion conditions in which the organic polymer dissolves are used, the organic polymer coats the peripheries of the thermally conductive filler particles or forms a single film of the organic polymer to inhibit the formation of a thermally conductive cluster. For this reason, it is necessary to appropriately select an appropriate organic medium and a combination thereof, or the dispersion conditions such as the dispersion temperature and the dispersing method. In particular, a combination of an oil-soluble medium and a water-soluble medium is preferred because dissolution of the organic polymer can be prevented while uniform dispersion of the composition is maintained. It is particularly preferable to use a mixed medium dispersion liquid in which an organic polymer has been precipitated by adding dropwise a solution of organic polymer particles in an oil-soluble medium, into a water-soluble medium in which a thermally conductive filler is dispersed.

In regard to the method for dispersing a high filler-loaded composition and a dispersing medium, known methods capable of uniform mixing/uniform dispersing, such as dispersing methods of using mechanical dispersion such as a homomixer or a homogenizer, or ultrasonication, can be used. The concentration of the high filler-loaded composition in the coating liquid is preferably 10 to 50% by weight. When the concentration of the high filler-loaded composition in the coating liquid is 10% by weight or more, separation between the organic polymer and the thermally conductive filler does not easily occur, and when the concentration is 50% by weight or less, it is easier to produce a uniform thin film by dilution. Even in the case of using an organic medium, known dispersion stabilizers can be used to the extent that the properties of the high thermal conductive material are not adversely affected.

Furthermore, the high filler-loaded composition can be used in the production of molded articles including sheets, films and the like that will be described below.

<Molded Article>

Molded articles according to the present invention include sheets, films and the like, and a known powder molding method of shaping a material in a powdered state and heating and molding the material, for example, a hot press molding method can be used. A molded article having a shape according to the application can be easily obtained by using a mold which gives a desired shape. In particular, when a sheet or a film is produced, it is preferable to use the material impregnated with a coating liquid or a dispersing medium. Also, a molded article having a multiphase structure or a gradient structure, for example, an integrated molded article having a biphasic structure composed of an insulating phase and an electroconductive phase, or a gradient structure including an insulating phase and electroconductive phases having different filler concentrations, can be obtained by using different materials as molding raw materials. At this time, use can be made of known methods such as a method of separately shaping compositions formed from various materials in a powdered state, and molding the resultants at the end to obtain an integrated molded article; and a method of molding compositions formed from various materials in different stages, and obtaining an integrated molded article at the end. In this manner, the difference in the coefficient of thermal expansion between a semiconductor element and a ceramic substrate or a metal heat dissipation component can be made small.

Furthermore, a molded article can also be formed using a high filler-loaded high thermal conductive material obtained by a method of applying and solid-drying the above-described coating liquid on a base material.

The proportions of the organic polymer and the thermally conductive filler in the molded article are basically the same as those in the composition, except for the non-woven fabric used as a reinforcing material at the time of molding, and also similarly to the case of the composition, the molded article can contain known additives, reinforcing preparations and/or other fillers as necessary, to the extent that the inclusion does not cause contradiction to the purpose of the present invention. Examples of the additives include a mold releasing agent, a flame retardant, an oxidation inhibitor, an emulsifier, a softening agent, a plasticizer, a surfactant, a coupling agent, and a compatibilizer. Examples of the reinforcing materials include short fibers formed from glass fiber, carbon fiber, metal fibers and inorganic fibers, and non-woven fabrics formed from these fibers, and recycled products obtainable by heat treating carbon fiber that has been used or has become a waste material. Examples of the other fillers include calcium carbonate (limestone), glass, talc, silica, mica, metal powders, metal oxides, aluminum nitride, boron nitride, silicon nitride, and diamond. These additives, reinforcing agents and/or other fillers are generally used by being added to a raw material mixture; however, when used as a reinforcing material, in the case of fiber, a non-woven fabric or the like, it is preferable to use the reinforcing material in the stage of molding.

Since the high thermal conductive material and molded article of the present invention are configured as above, despite being a high filler-loaded thermally conductive material, a high thermal conductive material or a molded article having, for example, in the case of using graphite, a thermal conductivity of 10 to 150 W/mK, a coefficient of thermal expansion of $3\times10^{-6}$ to $30\times10^{-6\circ}$ $C.^{-1}$, and a surface electrical conductivity of 5 to 200 $(\Omega cm)^{-1}$ while maintaining the mechanical strength, is preferred. On the other hand, in the case of using hexagonal boron nitride, a material having a thermal conductivity of 5 to 50 W/mK, a coefficient of thermal expansion of $3\times10^{-6}$ to $30\times10^{-6\circ}$ $C.^{-1}$, and an electrical conductivity of $10^{-10}$ $(\Omega cm)^{-1}$ or less is preferred. Therefore, it is also possible to impart other functions such as electrical conductivity, insulating properties, and electromagnetic wave shielding properties in accordance with the intended use. Furthermore, since the polymer phase has a three-dimensionally entangled structure, in the case of using a thermoplastic resin and a thermoplastic elastomer as the organic polymer, a molded article of the present invention and another molded article formed from a polymer-containing material can be easily joined by ultrasonic welding or spin welding. Furthermore, since the difference in the coefficient of thermal expansion between materials can be made as small as possible, production of various products having satisfactory stability against thermal cycles reaching from a low temperature to a high temperature and reaching from a high temperature to a low temperature, and having various shapes and performances suitable for the intended use, is enabled. In particular, by using a gradient material, that is, a material in which plural materials having different compositions and structures are continuously changed and integrally combined, a molded article having small strain between materials can be provided by integral molding of a material having a small coefficient of thermal expansion such as a semiconductor element or a ceramic substrate, and a material having a large coefficient of thermal expansion such as aluminum or copper.

According to a preferred embodiment, the molded article is preferably formed such that the high filler-loaded high thermal conductive material is composed of two layers such as a layer having insulating properties and a layer having electrical conductivity being laminated. At this time, it is preferable that one layer of the two layers has a thermal conductivity of 15 to 120 W/mK and a coefficient of thermal expansion of $3\times10^{-6}$ to $30\times10^{-6}$ °C.$^{-1}$, and exhibits electrical conductivity with a surface electrical conductivity of 10 to 200 $(\Omega m)^{-1}$. Furthermore, it is preferable that the other layer of the two layers has a thermal conductivity of 5 to 50 W/mK or more and a coefficient of thermal expansion of $3\times10^{-6}$ to $10\times10^{-6}$ °C.$^{-1}$, and exhibits insulating properties with an electrical conductivity of $10^{-11}$ $(\Omega cm)^{-1}$ or less. At this time, the various layers of the high filler-loaded high thermal conductive material exhibiting electrical conductivity or insulating properties can be made of a gradient material, whereby the difference in the coefficient of thermal expansion at the interface of materials of different kinds can be made as small as possible. Since the molded article of the present invention exists in a state in which the organic polymer is uniformly mixed therein, perforation or cutting into various shapes can be easily achieved, and microprocessing with high accuracy can be carried out.

As such, by using the high thermal conductive material and molded article of the present invention enable strong joining without any loss in thermal conductivity, and enable packaging of components without using grease, an adhesive, a phase changing material, bolted joint or the like, whereby, the numbers of components and operation processes can be reduced to a large extent in the joining between different materials and between molded articles. Furthermore, since the high thermal conductive material has a high thermal emittance that is close to that of a black body as compared with ceramics and metals, heat dissipation characteristics that fairly exceed the thermal conductivity inherently possessed by the material itself can be manifested.

A molded article obtainable in this manner can exhibit features such as the lightweightness, molding processability, cutting processability, integrated moldability, dimensional stability possessed by the organic polymer, and improvements of physical properties in accordance with the application, while making the best of the features of the thermally conductive filler having a graphite-like structure used therein. For example, the molded article is useful in high heat dissipation applications, metal replacement applications, ceramic replacement applications, electromagnetic wave shielding applications, high precision components (low dimensional change), high electrical conduction applications, insulating applications, various gaskets, and the like. Specifically, the molded article is useful for electric/electronic components represented by various cases, gear cases, LED lamp-related components, lithium ion battery-related components, fuel cell-related components, connectors, relay cases, switches, variable condenser cases, optical pickup lens holders, optical pickup slide bases, various terminal boards, transformers, printed wiring boards, liquid crystal panel frames, power modules and housings thereof, plastic magnets, semiconductor element substrates and related heat dissipation components, liquid crystal display components, lamp covers for projectors and the like, FDD carriages, FDD chassis, actuators, HDD components such as chassis, computer-related components, and the like; domestic and office electric appliance components represented by VTR components, television components, irons, hair dryers, rice cooker components, microwave oven components, audio components, sound equipment components such as Audio Laserdisc (registered trademark) and compact disc/digital videodiscs, lighting components, refrigerator components, and air conditioner components; optical equipment/precision machine-related components represented by office computer-related components, telephone-related components, mobile telephone-related components, facsimile-related components, printer/copying machine-related components such as print head peripheries and transfer rolls, cleaning tools, motor components, microscopes, binoculars, cameras, timepieces and the like; automobile/vehicle-related components such as alternator terminals, alternator connectors, IC regulators, potentiometer bases for light dimmer, motor core sealing materials, insulator members, power seat gear housings, thermostat bases for air conditioning, air conditioner panel switchboards, horn terminals, electrical component insulating boards, lamp housings, LED lamp heat dissipation components, lithium ion battery heat dissipation components, fuel cell separators, and ignition device cases; a wide variety of housing fields represented by personal computer housings, mobile telephone housings, and housing applications for components such as tip antennas, installation antennas requiring shielding properties for electromagnetic waves in information and communication field, and the like; moreover, bulkhead plating requiring high dimensional accuracy, electromagnetic wave shielding properties, and barrier properties for gas, liquid and the like, applications requiring thermal and electrical conductivity or insulating properties, and automobile part applications, airplane part applications, electric/electronic component applications, thermal equipment component applications and the like, which are usefully used in equipment for outdoor installation or construction members, and in which weight reduction and the degree of freedom in shape are required, and metal replacement is eagerly desired.

EXAMPLES

Hereinafter, the present invention will be specifically explained by way of Examples, Comparative Examples and Reference Examples, but the scope of the present invention is not intended to be limited to these. Meanwhile, production and evaluation of raw materials and specimens were carried out as follows.

(1) Raw Materials:
[Organic Polymer Particles]
Polyphenylene sulfide (PPS) powder: W203A NATURAL manufactured by Kureha Corp., white powder, linear form, particle size 100 to 500 μm, melting point 296° C., heat of fusion 33 J/g, coefficient of thermal expansion $50\times10^{-6}$ °C.$^{-1}$ Polyphenylene sulfide (PPS) pellet: FZ-2100BK manufactured by DIC Corp., black pellet, crosslinked type, shape: about 1.5 mm in inner diameter×about 2 mm in length, melting point 280° C., heat of fusion 28 J/g, coefficient of thermal expansion $40\times10^{-6}$ °C.$^{-1}$ Polyethylene terephthalate (PET): waste PET bottle recycled product, white flakes, particle size 1 to 2 mm, melting point 254° C., heat of fusion 31 J/g, coefficient of thermal expansion $60\times10^{-6}$ °C.$^{-1}$ Polycarbonate (PC): NATURAL manufactured by Kasima Polymers Corp., white flakes, particle size 0.1 to 0.5 mm, melting point 236° C., heat of fusion 26 J/g, coefficient of thermal expansion $70\times10^{-6}$ °C.$^{-1}$ Polyethylene (PE): low melting point PE, SANWAX 161-P, manufactured by Sanyo Chemical Industries, Ltd., white powder, particle size 0.01 to 0.1 mm, melting point 110° C., heat of fusion 25 J/g, coefficient of thermal expansion $110 \times 10^{6}$ °C.$^{-1}$ Benzoxazine: P-d type benzoxazine manufactured by Shikoku Chemicals Corp., powder, particle size 0.01 to 0.1 mm, melting point 242° C., heat of fusion 25 J/g

[Thermally Conductive Filler Having Graphite-Like Structure]

Scale-like graphite (GF): BF-40K manufactured by Chuetsu Graphite Works Co., Ltd., scale-like black powder, average particle size 40 μm, thermal conductivity 150 to 200 W/mK Boron nitride (BN): hexagonal boron nitride simple grain type UHP-2 manufactured by Showa Denko K.K., average particle size 9 to 12 μm, molded article thermal conductivity 60 W/mK

[Other Thermal Conductive Material]

Short carbon fiber: DIALEAD K223HE manufactured by Mitsubishi Plastics, Inc., pitch-based carbon fiber, cylinder-shaped, average fiber length 6 mm, fiber diameter 11 μm, thermal conductivity 550 W/mK

[Other Filler]

Aluminum nitride: high purity H grade manufactured by Tokuyama Corp., white powder, average particle size about 3 μm, thermal conductivity 180 to 200 W/mK, coefficient of thermal expansion $4.2 \times 10^{-1}$ °C.$^{-6}$ (2) Measurement of Melting Point and Heat of Fusion of Polymer:

Portions of raw materials and molded article specimens produced with a mold were collected, and the heat generation behavior was analyzed using a differential scanning calorimeter DSC8230 manufactured by Rigaku Corp. The endotherm peak temperature (° C.) and the heat of fusion per resin (J/g resin) were determined, and these were taken as the bases for the melting point (° C.) and the degree of crystallization, respectively. Furthermore, the heat of fusion per resin corresponding to parts by weight of the filler was determined to multiply the heat of fusion per resin (J/g resin) with the weight proportion (wt %÷100) of the thermally conductive filler. This was taken as the heat of fusion per filler (J/g resin), and was employed as a measure for the crystalline portion of the resin existing around filler particles.

(3) Measurement of Average Particle Sizes of Raw Materials and Composition:

The average particle sizes were measured based on measurement of the average particle size from the particle size at the degree of cumulation of 50% using a laser diffraction type particle size distribution analyzer LA-500.

Alternatively, the average particle sizes were expressed as approximate values in a range of the particle size based on SEM or a magnifier observations.

(4) Observation by Scanning Electron Microscopy (SEM):

The particle sizes and shapes of raw materials and compositions were observed using a scanning electron microscope (SEM)S-4800 (resolution: 1.0 nm, accelerating voltage: 0.5 to 30 kV, magnification: ×20 to 800,000) manufactured by Hitachi, Ltd.

(5) Measurement of Density:

A composition powder was introduced into a mold for specimen production to a predetermined thickness, and was heated under pressure at a predetermined temperature for a predetermined time using a disk type hydraulic heat press machine. Thus, a molded article specimen was produced. The density was determined from the weight and volume of the specimen. On the other hand, the density of the molded article specimen obtained using a twin-screw extruder was measured by a water immersion method.

(6) Measurement of Thermal Conductivity and Electrical Conductivity:

The thermal conductivity of a molded article specimen was measured using a thermal property analyzer by a hot disc method (TPS2500S) manufactured by Kyoto Electronics Manufacturing Co., Ltd. A hot disc method takes consideration of making measurement to the extent that heat generated from a hot disc sensor is transferred to the interior of a specimen, and the heat does not reach to the end of the specimen. Thus, the hot disc method is to measure thermal conductivity in the range from the surface of a specimen to a certain depth. Furthermore, the electrical conductivity at the surface and a cross-section of the same specimen was measured according to JIS K7194 using a low resistivity meter, Loresta GP (four-point probe method) manufactured by Mitsubishi Chemical Analytech Co., Ltd. When the electrical conductivity was $10^{-7}$ (Ωcm)$^{-1}$ or less (measurement limit), the volume resistivity was measured according to JIS K6271 using a high resistivity meter manufactured by Mitsubishi Chemical Analytech Co., Ltd., HIRESTA UX type MCP-T800 (double ring electrode method), and the volume resistivity was used after being converted to electrical conductivity (Ωcm)$^{-1}$ (corresponding to cross-sectional electrical conductivity) (measurement limit $10^{-15}$ (Ωcm)$^{-1}$).

(7) Measurement of Coefficient of Thermal Expansion:

A molded article specimen obtained by hot press molding was cut to produce a measurement sample having a size of about 3.6 mm in height×about 3.6 mm in width×13 mm or less in length. The specimen was heated using a thermal expansion analyzer (TMA60) manufactured by Shimadzu Corp. at a rate of 5° C./min, and the coefficient of thermal expansion was measured in a temperature range of 27 to 180° C. at every 10 minutes. For Examples and Comparative Examples, the values of the coefficient of thermal expansion at 160° C. were described.

(8) Bending Test

A molded article specimen obtained by hot press molding was cut to produce a measurement sample having a size of about 10 mm in width u about 10 mm in thickness u about 40 mm in length. Bending strength and flexural modulus of elasticity were measured according to JIS K7171 using a universal testing machine (AG¯100 kNE type) manufactured by Shimadzu Corp. Meanwhile, the dimension of the measurement samples (Comparative Examples 3 to 8) for the molding test obtained using a twin-screw extruder was 10 mm in width×4 mm in thickness×80 mm in length.

(9) Heat Dissipation Test

In a thermostatic chamber set at an ambient temperature of 30° C., a heat dissipation component having a comb-type fin structure was installed with the fin parts facing upward. A heater of 7.68 W, in which the heater part was sealed with polyimide, was fixed using a commercially available thermally conductive silicone grease or high thermal conductive insulating material between the heater and the heat dissipation component. Inside the thermostatic chamber, the heater was installed so as to have the heater part in the lower side, and temperatures were measured by fixing thermocouples, with the same polyimide tape, at three sites including the interface between the heater part and the atmosphere, the interface between the heat dissipation component base immediately above and right next to the heater and the atmosphere, and the interface between the tips of the heat dissipation component fins and the atmosphere. The temperature measurement values were input to a data logger, temperature changes were measured, and the time taken to reach an equilibrium state, the temperature ($T_1$) of the heater part, the temperature ($T_2$) at a site immediately above and right next to the heater, the temperature ($T_3$) of the tips of the fins, and the ambient temperature ($T_4$) of the thermostatic chamber at that time were measured to obtain the thermal resistance ($R = \Delta T/W$) between various temperatures. The obtained thermal resistance is taken as the reference for heat dissipation characteristics.

Examples 1 to 4 and Comparative Examples 1 and 2

A high filler-loaded composition was produced and cast in a powdered state using a mold and a hot pressing machine, and press molding was carried out under pressure and under heating to produce a specimen (molded article). Specifically, scale-like graphite and polyphenylene sulfide (PPS) powders at the contents expressed in wt % in Table 1 were introduced into a magnetic pot of a disk type ball mill BM$^{-1}$0 manufactured by Seiwa Giken Co., Ltd., and the contents were pulverized and mixed for 5 hours using magnetic balls to obtain a uniform composition. At this time, the particle size of the composition thus obtained was determined by microscopic observation by SEM.

Next, about 20 to 30 g of the composition was weighed and introduced into a mold having a size of 40 mm in length×40 mm in width to obtain a molded article thickness of about 10 mm, and press molding was carried out using a hot pressing machine by heating to a mold setting temperature of 340° C. at a rate of 5° C./min under pressure at 5 to 10 MPa (51 to 102 kgf/cm$^2$), while adjusting the pressure so as to prevent liquid leakage, and then maintaining the state for 30 minutes. Thereafter, the molded article was cooled to 20° C. for 0.5 hours and solidified, and thus a high filler-loaded high thermal conductive material specimen was obtained.

The density, thermal conductivity, and electrical conductivity of the specimen (molded article) thus obtained were measured by the methods described above. Also, a specimen was cut from the molded product, and analyses of the coefficient of linear expansion, bending strength, flexural modulus of elasticity, heat of fusion per resin, and heat of fusion per filler were carried out by the methods described above. The results thus obtained are presented in the following Table 1.

TABLE 1

|  |  | Example | | | | Comparative Example | |
| --- | --- | --- | --- | --- | --- | --- | --- |
|  |  | 1 | 2 | 3 | 4 | 1 | 2 |
| Composition | PPS powder (wt %) | 60 | 50 | 30 | 5 | 70 | 2 |
|  | Scale-like graphite (wt %) | 40 | 50 | 70 | 95 | 30 | 98 |
|  | Mixing method | Ball mill/powder mixing | | | | | |
|  | Average particle size (μm) | 20 to 60 | 20 to 60 | 20 to 60 | 20 to 60 | 20 to 60 | 20 to 60 |
| Molded article | Density (g/cm$^3$) | 1.55 | 1.65 | 1.78 | 1.92 | 1.50 | Impossible to be molded |
|  | Thermal conductivity (W/mK) | 15.5 | 25.2 | 38.2 | 62.2 | 3.70 |  |
|  | Surface electrical conductivity (($\Omega$cm)$^{-1}$) | 0.85 | 1.39 | 25.8 | 120 | 0.29 |  |
|  | Cross-section electrical conductivity ($\Omega$cm)$^{-1}$) | 0.25 | 0.61 | 2.40 | 17.5 | 0.10 |  |
|  | Coefficient of thermal expansion ($\times 10^{-6}$ q$C^{-1}$) | 40.5 | 29.8 | 12.3 | 1.95 | 43.7 |  |
|  | Bending strength (MPa) | 43 | 43 | 41 | 45 | 45 |  |
|  | Flexural modulus of elasticity (GPa) | 3.2 | 3.0 | 3.0 | 3.4 | 3.4 |  |
|  | Heat of fusion per resin (J/g resin) | 35 | 38 | 31 | 18 | 33 |  |
|  | Heat of fusion per filler (J/g resin) | 14.0 | 19.0 | 21.7 | 17.1 | 9.9 |  |

As is obvious from the results of the above Table 1, it was found that the high filler-loaded high thermal conductive materials (molded articles) of Examples 1 to 4 had excellent heat conductivities, electrical conductivities and coefficients of linear thermal expansion, even in the case where the materials contained organic polymers, as compared with the molded article of Comparative Example 1. Furthermore, regarding the bending strength and flexural modulus of elasticity, results similar to Comparative Example 1 that contained a large amount of the organic polymer were obtained. In Comparative Example 2 having a very low content of the organic polymer, shaping was achieved, but disintegration occurred even under slight force, and a molded article was not obtained (bending strength and flexural modulus of elasticity could not be measured). As such, it was found that the Examples were superior to the Comparative Examples. Furthermore, it was found that the coefficient of thermal expansion decreased when the concentration of the thermally conductive filler (scale-like graphite) increased, and thus the coefficient of thermal expansion can be controlled by the concentration of the thermally conductive filler. In addition, a SEM photograph of the scale-like graphite-PPS resin mixture of Example 4 obtained by performing powder mixing with a ball mill, and a SEM photograph of scale-like graphite used as a raw material are presented in FIG. 9 and FIG. 10. It was found that even if pulverized and mixed with a ball mill, the flat scale-like shape of graphite was maintained, and one half or more of the average planar particle size was maintained. From a comparison between the results described above and the thermal conductivity, electrical conductivity, coefficient of thermal expansion, bending strength, and flexural modulus of elasticity of Comparative Examples 3 to 5 as described below, it is understood that the scale-like graphite-PPS resin mixture obtained by powder mixing with a ball mill in Example 4 was formed so that the scale-like graphite was dispersed by delamination while maintaining the average planar particle size.

Reference Examples 5 to 7 and Comparative Examples 3 to 5

High filler-loaded high thermal conductive materials were obtained by the same method as that used in Example 1, except that the compositions were prepared at the compositions of Table 2, and raw materials were mixed for 3 minutes with a mixer (swift electric coffee mill), or raw materials were inserted into a bag and mixed by manually shaking (hand blending) for 5 minutes so as to be sufficiently mixed. The density, thermal conductivity, electrical conductivity, coefficient of thermal expansion, bending strength, flexural modulus of elasticity, heat of fusion per resin, and heat of fusion per filler of each of the specimens (molded articles) thus obtained were measured by the same methods as described above. The results thus obtained are presented in Table 2.

From the results of Examples 1 to 4 and Reference Examples 3 to 5, it was found that the values of thermal conductivity increased as the concentration of the thermally conductive filler (scale-like graphite) increased, except for Comparative Example 5. Furthermore, the Examples gave superior results to the Comparative Examples. Also, with reference to the results of Examples 1 to 4 and Reference Examples 5 and 6 and Example 1, the bending strength and the flexural modulus of elasticity had almost the same values. The mixing force was such that ball mill>mixer>>hand blending. These results imply that the bending strength and the flexural modulus of elasticity depend strongly on the uniform miscibility at the time of mixing. Meanwhile, particularly in Reference Example 7, Comparative Example 4 and Comparative Example 5 having high filler concentrations, the values of the bending strength and the flexural modulus of elasticity markedly decreased.

Furthermore, with reference to the results of Comparative Examples 3 to 5, since shear force almost does not work at the time of mixing in hand blending, mixing between the organic polymer particles and the thermally conductive filler at the level of fine particles occurs insufficiently, so that the organic polymer does not sufficiently penetrate in between the filler particles, and this leads to a decrease in density at the same filler concentration. For this reason, vacant spaces (voids) between the filler particles could not be sufficiently eliminated, and this led to significant decreases in the thermal conductivity, bending strength and flexural modulus of elasticity.

The thermal conductivity increases almost linearly with the concentration of the thermally conductive filler; however, the electrical conductivity increases exponentially, and is strongly affected by the properties of the resin, or morphology thereof in the system. The specimens of the Comparative Examples show higher values than the Examples. The reasons for this are considered to be as follows: since shear force at the time of mixing is weak, there is almost no

TABLE 2

|  |  | Reference Example | | | Comparative Example | | |
| --- | --- | --- | --- | --- | --- | --- | --- |
|  |  | 5 | 6 | 7 | 3 | 4 | 5 |
| Composition | PPS powder (wt %) | 50 | 25 | 10 | 50 | 25 | 10 |
|  | Scale-like graphite (wt %) | 50 | 75 | 90 | 50 | 75 | 90 |
|  | Mixing method | Mixer/ powder mixing | | | Hand blending/ power mixing | | |
|  | Average particle size (μm) | 20 to 80 | 20 to 80 | 20 to 80 | 20 to 200 | 20 to 200 | 20 to 200 |
| Molded article | Density (g/cm$^2$) | 1.67 | 1.91 | 1.89 | 1.66 | 1.75 | 1.78 |
|  | Thermal conductivity (W/mK) | 12.5 | 26.8 | 40.7 | 10.8 | 17.8 | 2.45 |
|  | Surface electrical conductivity (($\Omega$cm)$^{-1}$) | 0.15 | 21.0 | 67.1 | 17.2 | 46.6 | 103 |
|  | Cross-section electrical conductivity ($\Omega$cm)$^{-1}$ | 0.04 | 6.09 | 18.9 | 6.14 | 20.3 | 29.8 |
|  | Coefficient of thermal expansion ($\times 10^{-6}$qC$^{-1}$) | 35.5 | 20.6 | 8.04 | 35.7 | 33.4 | 30.3 |
|  | Bending strength (MPa) | 49 | 45 | 25 | 33 | 14 | 3.7 |
|  | Flexural modulus of elasticity (GPa) | 2.6 | 3.1 | 2.8 | 2.0 | 0.82 | 0.33 |
|  | Heat of fusion per resin (J/g resin) | 36 | 33 | 16 | 28 | 20 | 15 |
|  | Heat of fusion per filler (J/g resin) | 18.0 | 24.8 | 14.4 | 14.0 | 15.0 | 13.5 | damage in the filler; and when electrical conduction paths are formed even in some part, a large amount of electric current may easily flow from the paths. The electrical conductivities in the Comparative Examples are higher than the electrical conductivities in the Examples; however, since the thermal conductivity or mechanical properties have been significantly deteriorated, the Comparative Examples have no practical value.

Furthermore, in regard to the coefficient of thermal expansion, the value decreases significantly together with the thermally conductive filler concentration in the Examples, but the extent of the decrease is low in the Comparative Examples. This is speculated to be because in the Examples, a phase A formed from the organic polymer only and a phase B containing a filler as a main component are entangled, the phase B forms a three-dimensional network structure to form a thermally conductive infinite cluster; however, in the Comparative Examples, the extent of the formation is weak.

Comparative Examples 6 to 11

In regard to a composition containing organic polymer particles and a thermally conductive filler, the organic polymer particles and the thermally conductive filler were subjected to melt mixing pelletization or melt mixing sheet fabrication, and thus a composition that had been produced into a pellet or a sheet, is produced (the organic polymer particles in the composition are not in the form of particles). Thereby, high filler-loaded high thermal conductive materials were produced.

A PPS pellet and a PPS sheet at predetermined concentrations were produced by melt kneading at a temperature of 280° C. to 340° C. using a twin-screw extruder (KZW20-30MG manufactured by Technovel Corp). Specifically, pellets having the compositions of Table 3 were produced using the PPS pellet and scale-like graphite. Subsequently, the pellets were respectively cooled and solidified for 0.1 hours at a press setting temperature of 320° C., after a preheating time of 10 minutes under a pressurization condition of 3.6 MPa (36.7 kgf/cm$^2$), using a mold having a size of 120 mm in length×70 mm in width×5 mm in thickness and a hot pressing machine. Thus, high filler-loaded high thermal conductive material specimens were produced (Comparative Examples 6 to 8).

Furthermore, sheets were produced to have the compositions of Table 3 using a PPS powder and scale-like graphite, and using a T-die for sheet production (100 mm in width×16 mm in thickness). Subsequently, the sheets were respectively press molded under pressure and under heating according to Comparative Example 6 using a mold and a hot pressing machine to produce high filler-loaded high thermal conductive material specimens (Comparative Examples 9 to 11).

The density, thermal conductivity, electrical conductivity, coefficient of linear expansion, bending strength, flexural modulus of elasticity, heat of fusion per resin, and heat of fusion per filler of each of the specimens (molded articles) thus obtained were measured by the same methods as described above. The results thus obtained are presented in Table 3.

TABLE 3

|  |  | Comparative Example | | | | | |
|---|---|---|---|---|---|---|---|
|  |  | 6 | 7 | 8 | 9 | 10 | 11 |
| Twin-screw extrusion | PPS pellet (wt %) | 70 | 50 | 30 |  |  |  |
|  | PPS powder (wt %) |  |  |  | 70 | 50 | 30 |
|  | Scale-like graphite (wt %) | 30 | 50 | 70 | 30 | 50 | 70 |
|  | Mixing method | Twin-screw extrusion/melt mixing | | | | | |
|  | Shape after extrusion | Pellet | | | Sheet | | |
| Molded article | Density (g/cm$^2$) | 1.42 | 1.70 | 1.75 | 1.40 | 1.70 | 1.75 |
|  | Thermal conductivity (W/mK) | 1.05 | 5.43 | 6.00 | 1.04 | 4.55 | 6.23 |
|  | Surface electrical conductivity (($\Omega$cm)$^{-1}$) | <10$^{-7}$ | <10$^{-7}$ | 0.007 | <10$^{-7}$ | <10$^{-7}$ | 0.007 |
|  | Coefficient of linear thermal expansion (×10$^{-6°}$ C$^{-1}$) | 35.4 | 33.8 | 30.5 | 45.2 | 40.4 | 35.2 |
|  | Bending strength (MPa) | 45 | 42 | 40 | 43 | 40 | 39 |
|  | Flexural modulus of elasticity (GPa) | 5.3 | 7.0 | 11 | 5.5 | 7.2 | 12 |
|  | Heat of fusion per resin (J/g resin) | 25 | 23 | 20 | 35 | 33 | 30 |
|  | Heat of fusion per filler (J/g resin) | 7.8 | 7.5 | 9.1 | 9.0 | 10.0 | 12.6 |

From the results of Comparative Examples 6 to 11, in the melt mixing using a twin-screw extruder, the thermal conductivity and the electrical conductivity values were markedly lower, and controllability of the coefficient of thermal expansion by the filler concentration was also inferior, compared with Examples 1 to 7. Thus, it is understood that a thermally conductive infinite cluster is not formed. It is speculated that the values of the bending strength and the flexural modulus of elasticity are high because in the sea-island structure of the organic polymer and the filler, the organic polymer phase forms the sea.

Examples 8 to 13

High filler-loaded high thermal conductive materials were obtained at the compositions of Table 4 by the same method as that used in Example 1, by newly providing a polyethylene terephthalate (PET) powder and a polycarbonate (PC) powder (Examples 8 to 13).

The density, thermal conductivity, electrical conductivity, coefficient of linear expansion, bending strength, flexural modulus of elasticity, heat of fusion per resin, and heat of fusion per filler of the specimens (molded articles) thus obtained were measured by the same methods as described above. The results thus obtained are presented in Table 4.

Meanwhile, in regard to PC which is a non-crystalline aromatic resin, the heat of fusion of the raw material powder exhibited a high value such as 26 J/g resin, but the molded article did not exhibit an endotherm peak that represents the melting point. Thus, the molded article was annealed for 2 hours at 180° C. to 240° C., and an endotherm peak corresponding to the melting point appeared. Therefore, this was determined as the heat of fusion. Table 4 presents this value.

high thermal conductive materials were obtained at the compositions of Table 5 by the same method as that used in Example 1 (Examples 14 to 19).

The density, thermal conductivity, electrical conductivity, coefficient of linear expansion, bending strength, flexural modulus of elasticity, heat of fusion per resin, and heat of fusion per filler of each of the specimens (molded articles) thus obtained were measured by the same methods as described above. The results thus obtained are presented in Table 5.

Meanwhile, benzoxazine, which is a thermosetting resin, is a precursor (oligomer) of polybenzoxazine. The heat of fusion of the raw material was 25 J/g, but an endotherm peak corresponding to the heat of fusion of a molded article using this raw material was not observed. It is contemplated that except for the peripheries of the thermally conductive filler particles, the cured product was brought to an amorphous state with the progress of the curing reaction.

TABLE 4

| | | Example | | | | | |
|---|---|---|---|---|---|---|---|
| | | 8 | 9 | 10 | 11 | 12 | 13 |
| Composition | PET pellet (wt %) | 50 | 25 | 10 | | | |
| | PC powder (wt %) | | | | 50 | 25 | 10 |
| | Scale-like graphite (wt %) | 50 | 75 | 90 | 50 | 75 | 90 |
| | Mixing method | Ball mill/powder mixing | | | | | |
| | Average particle size (μm) | 20 to 200 | 20 to 200 | 20 to 100 | 20 to 80 | 20 to 80 | 20 to 80 |
| Molded article | Density (g/cm$^2$) | 1.63 | 1.88 | 2.01 | 1.49 | 1.79 | 2.03 |
| | Thermal conductivity (W/mK) | 11.7 | 34.8 | 48.3 | 7.71 | 18.7 | 42.9 |
| | Surface electrical conductivity ((Ωcm)$^{-1}$) | 7.72 | 32.2 | 110.5 | 2.00 | 7.44 | 77.9 |
| | Cross-section electrical conductivity ((Ωcm)$^{-1}$) | 2.50 | 9.64 | 35.6 | 0.83 | 2.06 | 19.3 |
| | Coefficient of thermal expansion (×10$^{-6}$ °C.$^{-1}$) | 31.4 | 16.8 | 5.06 | 40.3 | 24.2 | 9.56 |
| | Bending strength (MPa) | 26 | 31 | 33 | 50 | 48 | 17 |
| | Flexural modulus of elasticity (GPa) | 1.7 | 2.0 | 1.9 | 3.2 | 3.4 | 1.7 |
| | Heat of fusion per resin (J/g resin) | 24 | 14 | 13 | 0.7 | 3.2 | 1.4 |
| | Heat of fusion per filler (J/g resin) | 12.0 | 10.5 | 11.7 | 0.4 | 2.4 | 1.3 |

With reference to the results of Examples 8 to 13, similar results to Examples 1 to 4 were obtained, and thus it is understood that the Examples are superior to the Comparative Examples.

Examples 14 to 19

A low molecular weight polyethylene (PE) powder and benzoxazine were newly provided, and high filler-loaded

TABLE 5

| | | Example | | | | | |
|---|---|---|---|---|---|---|---|
| | | 14 | 15 | 16 | 17 | 18 | 19 |
| Composition | PET pellet (wt %) | 50 | 25 | 10 | | | |
| | Benzoxazine (wt %) | | | | 6 | 10 | 5 |
| | PC powder (wt %) | | | | 40 | | |
| | Scale-like graphite (wt %) | 50 | 75 | 90 | 54 | 90 | 95 |

TABLE 5-continued

|  |  | Example | | | | | |
| --- | --- | --- | --- | --- | --- | --- | --- |
|  |  | 14 | 15 | 16 | 17 | 18 | 19 |
|  | Mixing method | Ball mill/powder mixing | | | | | |
|  | Average particle size (μm) | 20 to 70 | 20 to 70 | 20 to 70 | 20 to 60 | 20 to 60 | 20 to 60 |
| Molded article | Density (g/cm$^2$) | 1.24 | 1.60 | 2.23 | 1.64 | 1.81 | 1.65 |
|  | Thermal conductivity (W/mK) | 3.12 | 25.5 | 39.0 | 18.9 | 44.0 | 42.0 |
|  | Surface electrical conductivity ((Ωcm)$^{-1}$) | 0.18 | 9.56 | 16.6 | 19.8 | 66.0 | 286 |
|  | Cross-section electrical conductivity ((Ωcm)$^{-1}$) | 0.05 | 2.81 | 5.51 | 5.56 | 25.0 | 40.0 |
|  | Coefficient of thermal expansion (×10$^{-6}$ °C.$^{-1}$) | 47.6 | 24.5 | 10.2 | 30.4 | 2.55 | 2.02 |
|  | Bending strength (MPa) | 13 | 18 | 25 | 43 | 49 | 53 |
|  | Flexural modulus of elasticity (GPa) | 0.61 | 0.97 | 2.5 | 3.2 | 4.0 | 5.5 |
|  | Heat of fusion per resin (J/g resin) | 40 | 31 | 12 | 15 | 0 | 0 |
|  | Heat of fusion per filler (J/g resin) | 20.0 | 23.3 | 10.9 | 8.1 | — | — |

With reference to the results of Examples 14 to 19, the same results as in Examples 1 to 4 were obtained, and thus it is understood that the Examples are superior to the Comparative Examples.

Examples 20 to 23 and Comparative Examples 12 and 13

A boron nitride (BN) powder and an aluminum nitride (AlN) powder were newly provided, and high filler-loaded high thermal conductive materials were obtained at the compositions of Table 6 by the same method as that used in Example 1 (Examples 20 to 23 and Comparative Examples 12 and 13).

The density, thermal conductivity, electrical conductivity, heat of fusion per resin, and heat of fusion per filler of each of the specimens (molded articles) thus obtained were measured by the same methods as described above. The results thus obtained are presented in Table 6. The electrical conductivity was measured by a double ring electrode method using a high resistivity meter (high resistivity meter manufactured by Mitsubishi Chemical Analytech Co., Ltd., HIRESTOR UX type MCP-T800).

TABLE 6

|  |  | Examples and Comparative Examples | | | | | |
| --- | --- | --- | --- | --- | --- | --- | --- |
|  |  | Example | | | | Comparative | |
|  |  | 20 | 21 | 22 | 23 | 12 | 13 |
| Composition | PPS powder (wt %) | 50 | 25 | 10 | 20 | 50 | 10 |
|  | BN powder (wt %) | 50 | 75 | 90 | 70 |  |  |
|  | AlN power (wt %) |  |  |  |  | 50 | 90 |
|  | Scale-like graphite (wt %) |  |  |  | 10 |  |  |
|  | Mixing method | Ball mill powder mixing | | | | | |
|  | Average particle size (μm) | 5 to 12 | 5 to 12 | 5 to 12 | 5 to 40 | 0.2 to 0.2 | 0.2 to 0.2 |
| Molded article | Density (g/cm$^2$) | 1.74 | 1.95 | 1.96 | 1.97 | 1.75 | 2.06 |
|  | Thermal conductivity (W/mK) | 8.50 | 17.1 | 24.0 | 18.6 | 0.98 | 1.68 |
|  | Electrical conductivity ((Ωcm)$^{-1}$) | <10$^{-14}$ | <10$^{-14}$ | 4 × 10$^{-14}$ | 7 × 10$^{-14}$ | <10$^{-14}$ | 4 × 10$^{-14}$ |
|  | Coefficient of thermal expansion (×10$^{-6}$ °C.$^{-1}$) | 39.5 | 18.4 | 7.63 | 15.0 | 38.4 | Sampling not possible |
|  | Bending strength (MPa) | 44 | 46 | 30 | 40 | 65 | 5.9 |
|  | Flexural modulus of elasticity (GPa) | 8.4 | 10.2 | 7.6 | 6.3 | 7.6 | 1.9 |
|  | Heat of fusion per resin (J/g resin) | 25 | 22 | 5.5 | 24 | 18 | 4.9 |
|  | Heat of fusion per filler (J/g resin) | 12.5 | 16.7 | 5.0 | 19.2 | 11.0 | 4.4 |

When compared with Comparative Examples 12 and 13 in which aluminum nitride that does not have a graphite-like structure and has a high thermal conductivity in a single sintered product, the high filler-loaded high thermal conductive materials of Examples that used hexagonal boron nitride having a graphite-like structure as a thermally conductive filler, produced excellent results similarly to Examples 1 to 4. In addition, in Comparative Example 13, the mechanical strength of the molded article specimen was weak, a sample for measuring the coefficient of thermal expansion could not be produced, and the coefficient of thermal expansion could not be measured.

Comparative Examples 14 to 19

Short carbon fiber was newly provided, and high filler-loaded high thermal conductive materials were obtained at the compositions of Table 7 by the same method as that used in Example 1 (Comparative Examples 14 to 19).

Figure 11:
FIG. 11 is a SEM photograph of a short carbon fiber-PPS resin composition produced using a ball mill.
Figure 12:
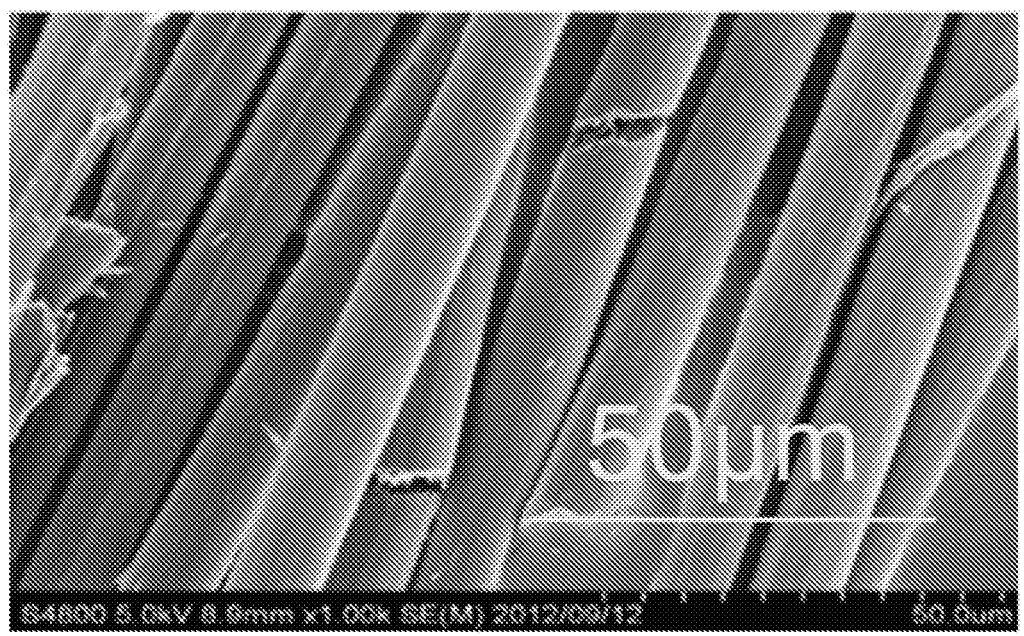
FIG. 12 is a SEM photograph of a short carbon fiber raw material.

The density, thermal conductivity, electrical conductivity, bending strength, flexural modulus of elasticity, heat of fusion per resin, and heat of fusion per filler of each of the molded article specimens thus obtained were measured by the same methods as described above. The results thus obtained are presented in Table 7. Meanwhile, Table 7 indicates the fiber size instead of the particle size of the composition.

an effect of increasing the mechanical strength, and it is possible to use the short carbon fiber as a reinforcing material to the extent that the use does not cause contradiction to the purpose of the present invention. Meanwhile, a SEM photograph of a short carbon fiber-PPS resin mixture obtained when powder mixing was carried out with a ball mill of Example 16, and a SEM photograph of the short carbon fiber used as a raw material are shown in FIG. 11 and FIG. 12. From the results of FIG. 11 and FIG. 12, it was found that when the short carbon fiber was pulverized and mixed together with a PPS resin in a ball mill, the short carbon fiber was micronized by losing its rod-shaped structure. That is, it is understood that short carbon fiber cannot maintain the average planar particle size of the short carbon fiber due to delamination. Also, it is contemplated that the short carbon fiber having a rod-shaped structure does not overlap satisfactorily with the plane crystal faces of the PPS resin, unlike graphite having a structure of a flat shape, a scale shape or the like. It is speculated that this is causative of a marked decrease in the thermal conductivity.

[FIGS. 1 to 8]

From the results of Examples 1 to 23 and Comparative Examples 1 to 19, the relationship between the filler concentration and thermal conductivity, the relationship between the filler concentration and electrical conductivity, the relationship between the filler concentration and the heat

TABLE 7

| | | Comparative Example | | | | | |
|---|---|---|---|---|---|---|---|
| | | 14 | 15 | 16 | 17 | 18 | 19 |
| Composition | PPS powder (wt %) | 50 | 25 | 10 | 50 | 25 | 10 |
| | Short carbon fiber (wt %) | 50 | 75 | 90 | 50 | 75 | 90 |
| | Mixing method | Ball mill dry mixing | | | Hand blending dry mixing | | |
| | Fiber size: Inner diameter ($\mu$m) | 9 to 11,500 | 9 to 10,100 | 1 to 10, 10 to 50 | About 11,1000 | About 11,1000 | About 11,1000 |
| | Length ($\mu$m) | to 2000 | to 500 | | to 5000 | to 5000 | to 5000 |
| Molded article | Density (g/cm$^2$) | 1.63 | 1.85 | 1.59 | 1.67 | 1.92 | 1.87 |
| | Thermal conductivity (W/mK) | 3.14 | 16.6 | 11.5 | 4.26 | 17.0 | 26.8 |
| | Surface electrical conductivity (($\Omega$cm)$^{-1}$) | 8.78 | 66.5 | 82.9 | 2.93 | 75.2 | 409 |
| | Cross-section electrical conductivity (($\Omega$cm)$^{-1}$) | 2.31 | 19.2 | 21.5 | 1.04 | 27.3 | 98.8 |
| | Bending strength (MPa) | 63 | 73 | 9.7 | 54 | 62 | 33 |
| | Flexural modulus of elasticity (GPa) | 4.0 | 4.4 | 0.46 | 4.3 | 3.9 | 0.96 |
| | Heat of fusion per resin (J/g resin) | 28 | 14 | 2.8 | 22 | 18 | 11 |
| | Heat of fusion per filler (J/g resin) | 14.0 | 10.5 | 2.5 | 11.0 | 13.5 | 9.9 |

From the results of Table 7, the carbon fiber having a similar graphite structure to graphite was such that when a ball mill was used upon mixing with PPS, the fiber was markedly damaged, the size was also decreased extremely, and the thermal conductivity and mechanical strength were markedly decreased particularly at the time of being highly loaded. On the other hand, in hand blending mixing, the shape was maintained; however, when compared with Examples 1 to 4, the thermal conductivities were markedly decreased. As such, alone use of short carbon fiber produced results that were overall inferior to the results of the Examples of the present invention. In addition, except for Comparative Example 19 in which the content of the short carbon fiber was 90% by weight, the short carbon fiber had of fusion per resin, the relationship between thermal conductivity and the heat of fusion per filler, and the relationship between the filler concentration and the coefficient of thermal expansion were plotted based on the data for mixing with (1) PPS powder-GF/ball mill, (2) PPS powder-GF/mixer, (3) PPS powder-GF/hand blending, (4) PPS powder-GF/twin-screw extrusion, (5) PPS pellet-GF/twin-screw extrusion, (6) PET powder-GF/ball mill, (7) PC powder-GF/ball mill, (8) PE powder-GF/ball mill, (9) benzoxazine-GF/ball mill, (10) benzoxazine-PPS powder-GF/ball mill, (11) PPS powder-BN/ball mill, (12) PP powder-aluminum nitride/ball mill, (13) PPS powder-carbon fiber/ball mill, and (14) PPS powder-carbon fiber/hand blending. The respective data are shown in FIG. 1. Meanwhile, the figures include experimental data that are not described in the Examples and Comparative Examples for better understanding.

Figure 2:
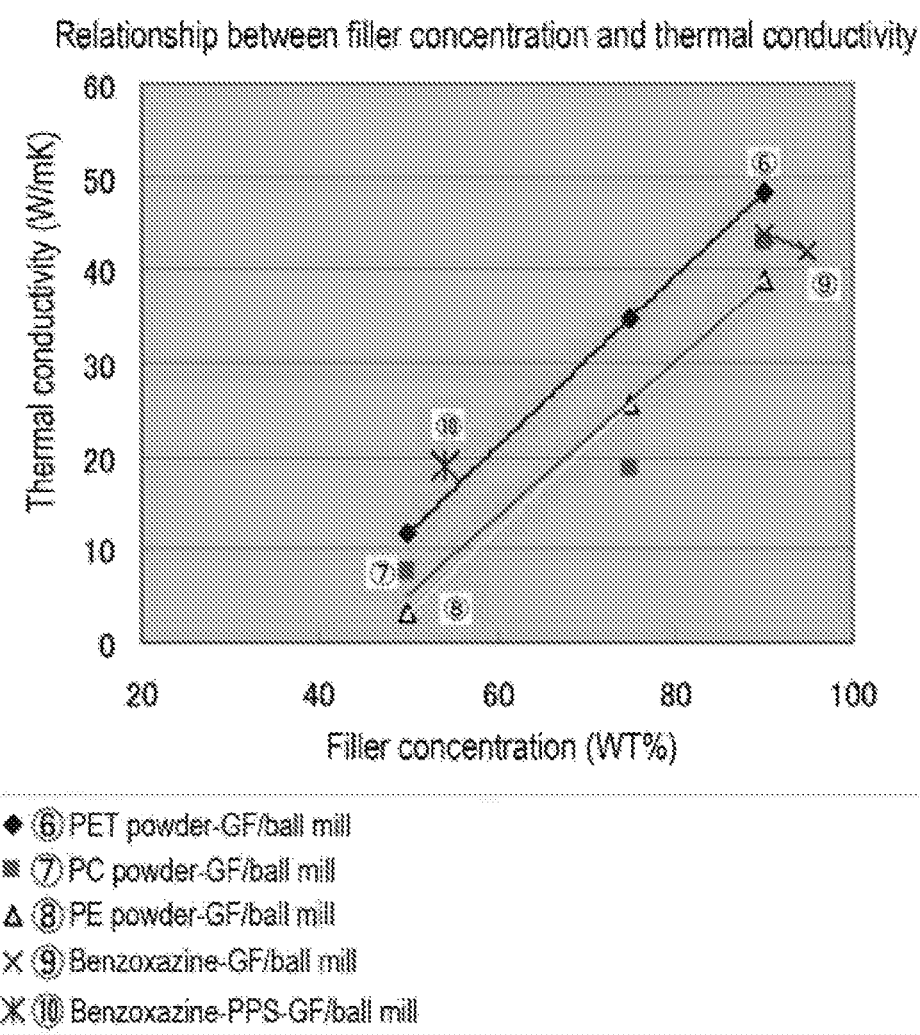
FIG. 2 is a graph illustrating the relationship between the filler concentration and the thermal conductivity.
Figure 3:
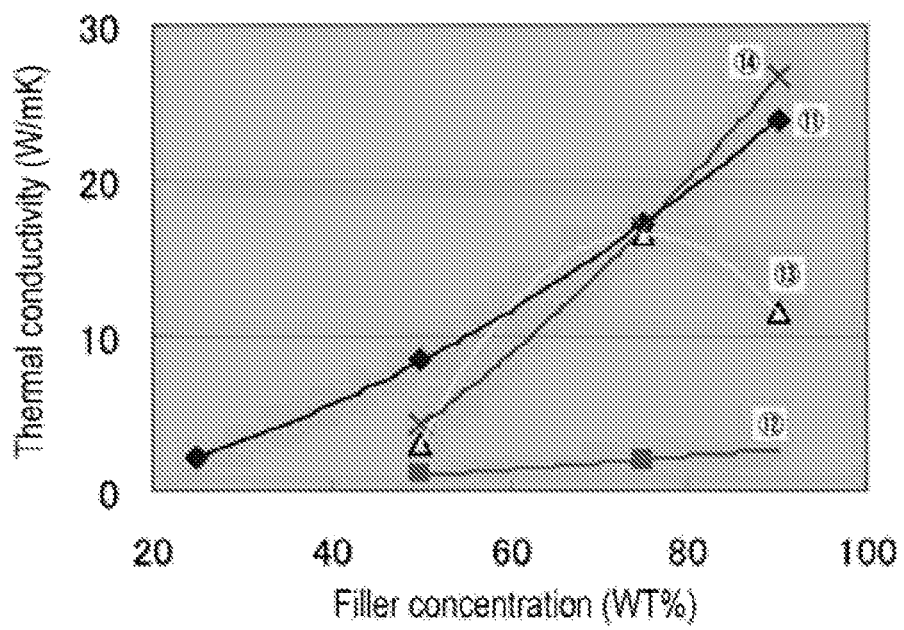
FIG. 3 is a graph illustrating the relationship between the filler concentration and the thermal conductivity.

In FIGS. 1 to 3, the thermal conductivity increases linearly with the filler concentration except for the Comparative Examples, and the order was as follows: (1)>(10) ≅ (6)>(2) ≅ (7) ≅ (8) ≅ (9)>(11) ≅ (14)>(13) ≅ (3)>(4) ≅ (5)>(13). Furthermore, it is understood that except for the short carbon fiber (13) and (14), the values of thermal conductivity of the Examples are higher, and the thermal conductivities are superior to the thermal conductivities of the Comparative Examples.

Figure 4:
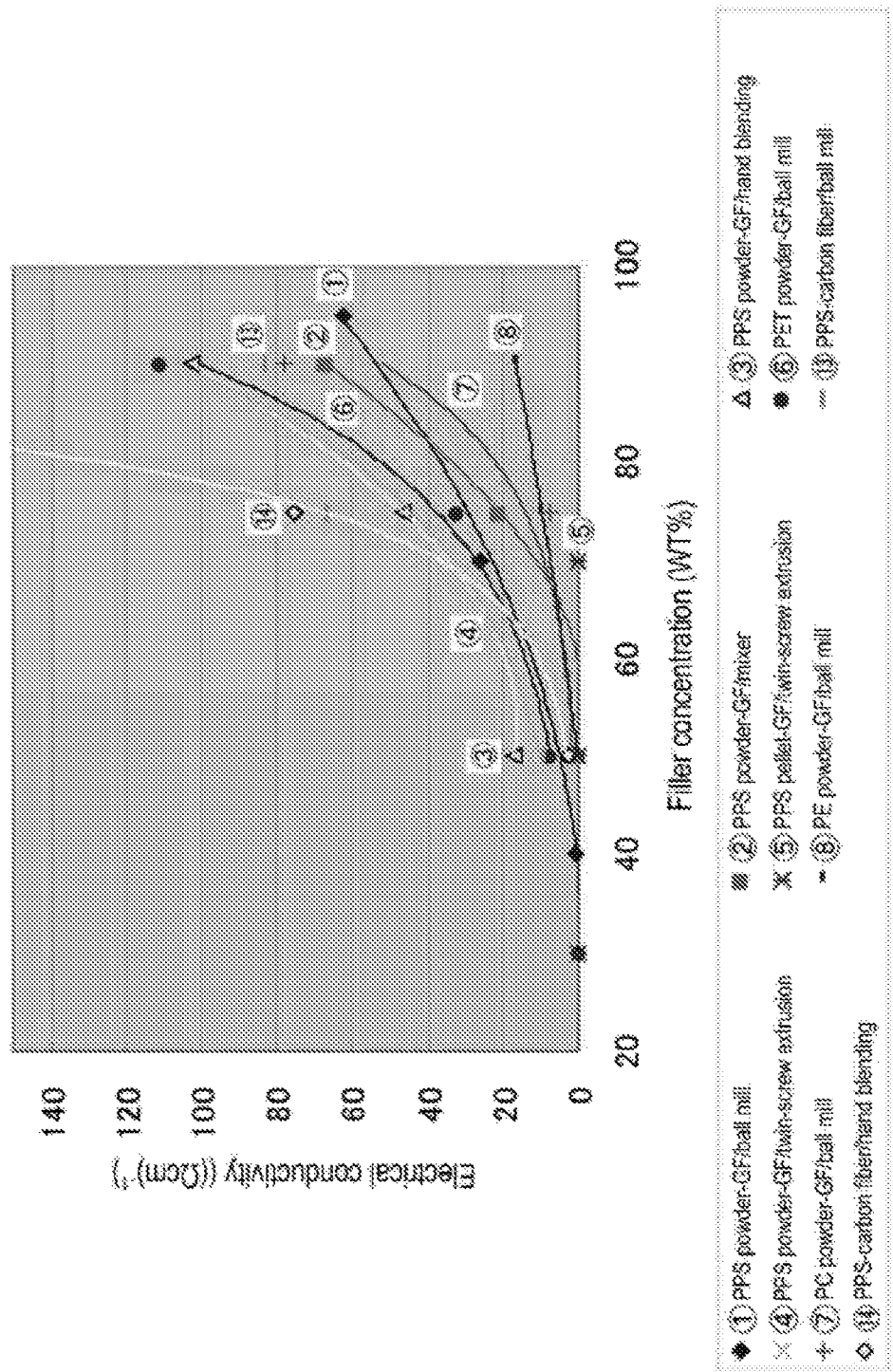
FIG. 4 is a graph illustrating the relationship between the filler concentration and the electrical conductivity.

With reference to FIG. 4, the surface electrical conductivity increases exponentially in the relationship with the filler concentration, and the order is almost as follows: (14)>(13)=(6)<(3)>(1)>(2)>(7)>(8)>(4) ≅ (5)>>(11)=(12). Some parts maybe different; however, the surface electrical conductivity is approximately correlated to the thermal conductivity, and the curve rises from a filler concentration of about 40% by weight, and this point is indicated as the percolation threshold. Also, descriptions on the difference between electrical conductivity and thermal conductivity are given in the discussion on the experimental results of Examples 1 to 7 and Comparative Examples 3 to 5.

Figure 5:
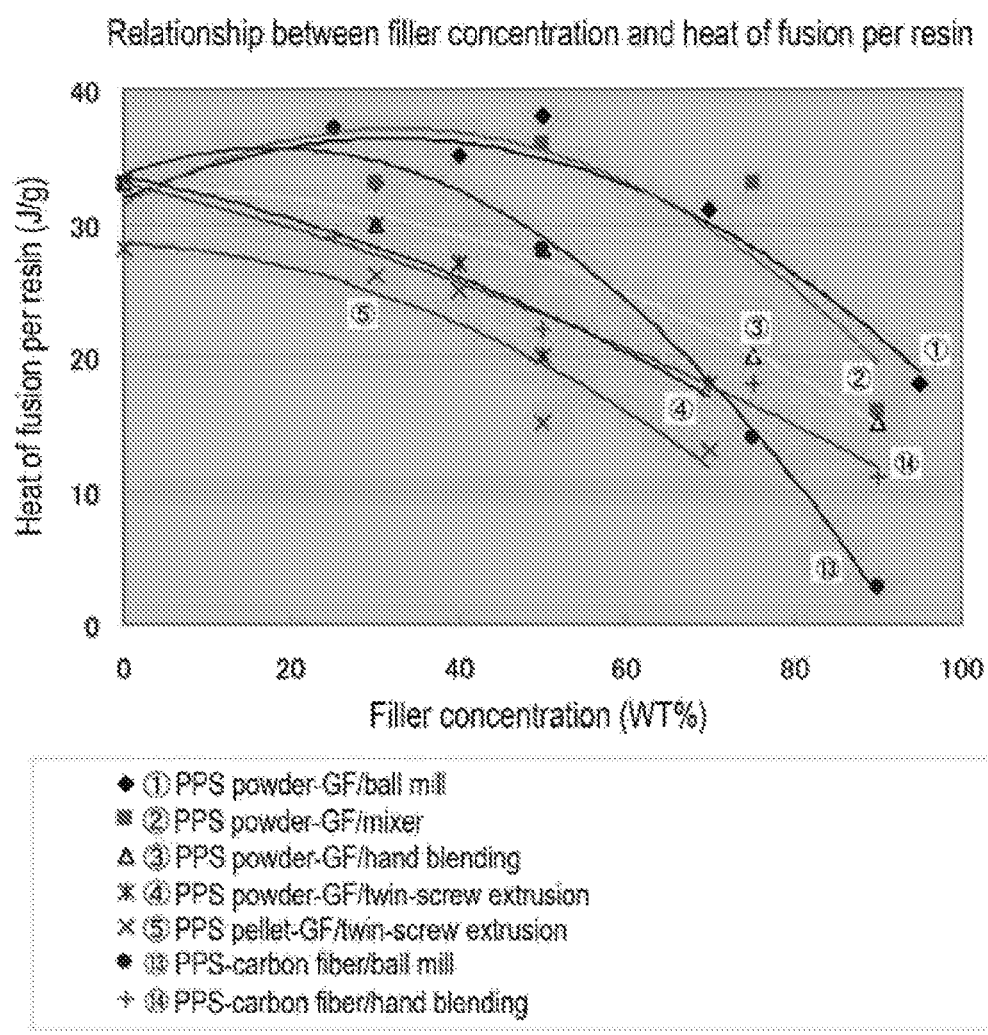
FIG. 5 is a graph illustrating the relationship between the filler concentration and the heat of fusion.

With reference to FIG. 5, the heat of fusion per resin decreases with the filler concentration in the following order: (1) ≅ (2) ≅ (3)>>(13)>(14) ≅ (4)>(5). Thus, the order is ball mill ≅ mixer>hand blending>twin-screw extrusion. Also, in the cases of carbon fiber (13) and (14), the heat of fusion significantly decreases at high filler concentrations. When pulverization and mixing is carried out with a ball mill, the brittle short carbon fiber undergoes a significant decrease in the particle size, and therefore, the degree of crystallization of PPS decreased. Compared with this, there was no decrease in the particle size in the case of the mixer, but strength decreases due to heterogenization. It is speculated that the heat of fusion per resin increases more than that of the raw material at a filler concentration of 20% to 50% by weight, because the degree of crystallization increases due to molding under pressure.

Figure 6:
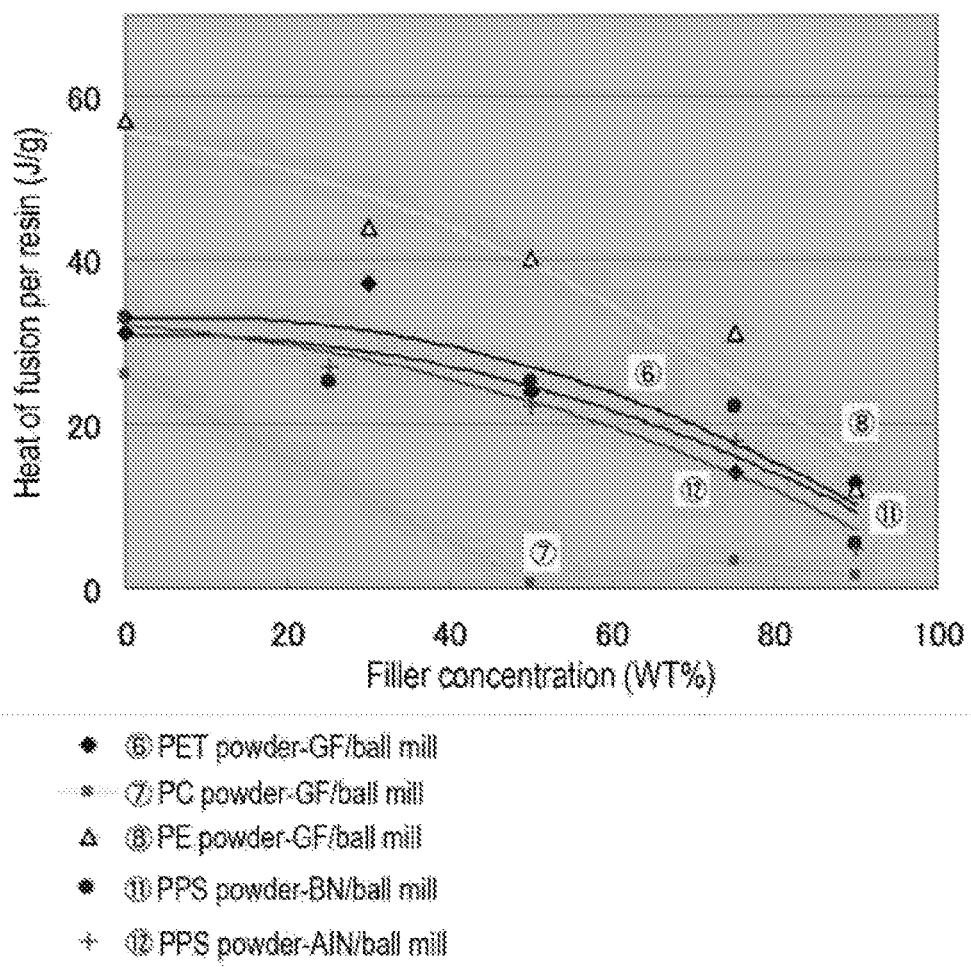
FIG. 6 is a graph illustrating the relationship between the filler concentration and the heat of fusion.

In FIG. 6 and Table 5, the heat of fusion per resin decreases almost in the order of (8)>(6)=(11)=(12)>>(7), and the heat of fusion per resin decreases in the order of aromatic crystalline resins (1), (2) and (6)>>aromatic non-crystalline resin (7)>>benzoxazine (9) and (10). Also, the heat of fusion per resin for boron nitride was slightly larger than the case of aluminum nitride. It was found that except for special cases, the heat of fusion per resin is closely related to the thermal conductivity. That is, it is speculated that the heat of fusion per resin of polyethylene which is a crystalline non-aromatic resin is high because the resin is a low melting point polyethylene, and a low molecular weight polymer having a wide molecular weight distribution (the width of the endotherm peak is also broad). On the other hand, in regard to polycarbonate, the raw material has a high heat of fusion (when condensation polymerization is carried out, an optimal molecular arrangement that can be easily crystallized is possible); however, it is speculated that in a molded article, an endotherm peak barely appears due to aging, and crystallization occurs in the vicinity of the filler particles. Furthermore, also for benzoxazine, an endotherm peak based on the melting point appears in the raw material; however, the endotherm peak is lost in a molded article due to thermal curing. It is speculated to be because bulky parts that are separated from the filler surfaces become amorphous due to thermal curing. In conclusion, since it is speculated that as crystallization occurs in the vicinity, particularly along the surface direction, of the thermally conductive filler having a graphite structure, the filler end faces can be fixed to form thermal conduction paths formed at a high level. Therefore, the magnitude of thermal conductivity is closely related to crystallization of the resin.

FIG. 7 shows the relationship between the thermal conductivities of aromatic crystalline resins excluding polycarbonate and polyethylene, and the heat of fusion per filler, separately for Examples and Comparative Examples. It is understood that thermal conductivity increases with an increase in the heat of fusion per filler. Furthermore, it is implied that except for some parts, Examples are superior to Comparative Examples, and the thermal conductivity is closely related to the heat of fusion of the resin. It is speculated that a neat linear relationship is not established because the gas bubbles at the filler-resin interface (density), the force of crystals (rigidity) and the like vary subtly depending on the filler concentration, molding conditions and method, the kind of resin, and the like, and this variation largely affects the thermal conductivity.

Figure 8:
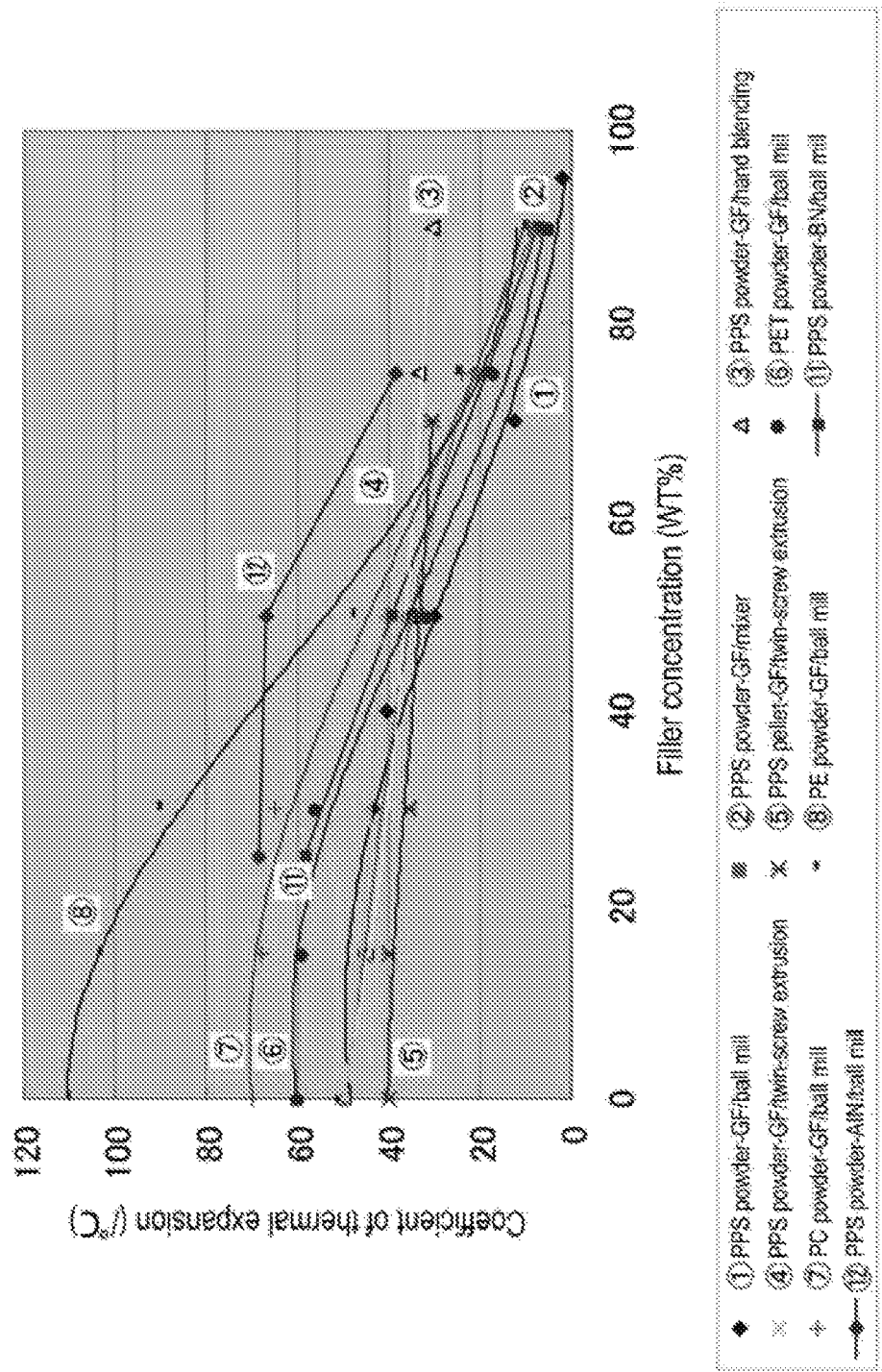
FIG. 8 is a graph illustrating the relationship between the filler concentration and the coefficient of thermal expansion.
Figure 9:
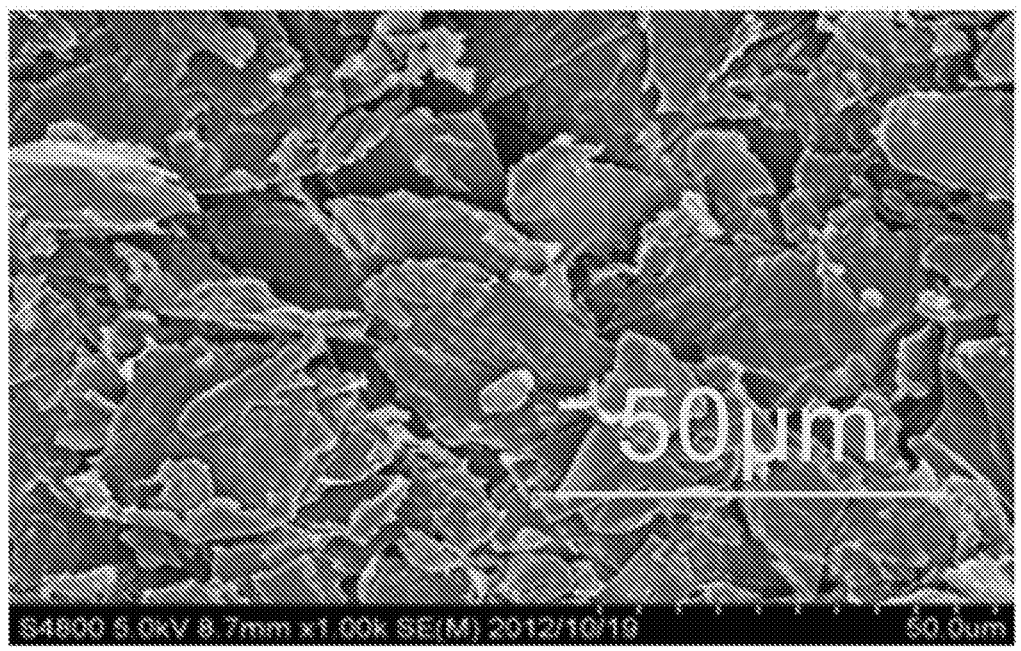
FIG. 9 is a SEM photograph of a graphite-PPS resin composition produced using a ball mill.
Figure 10:
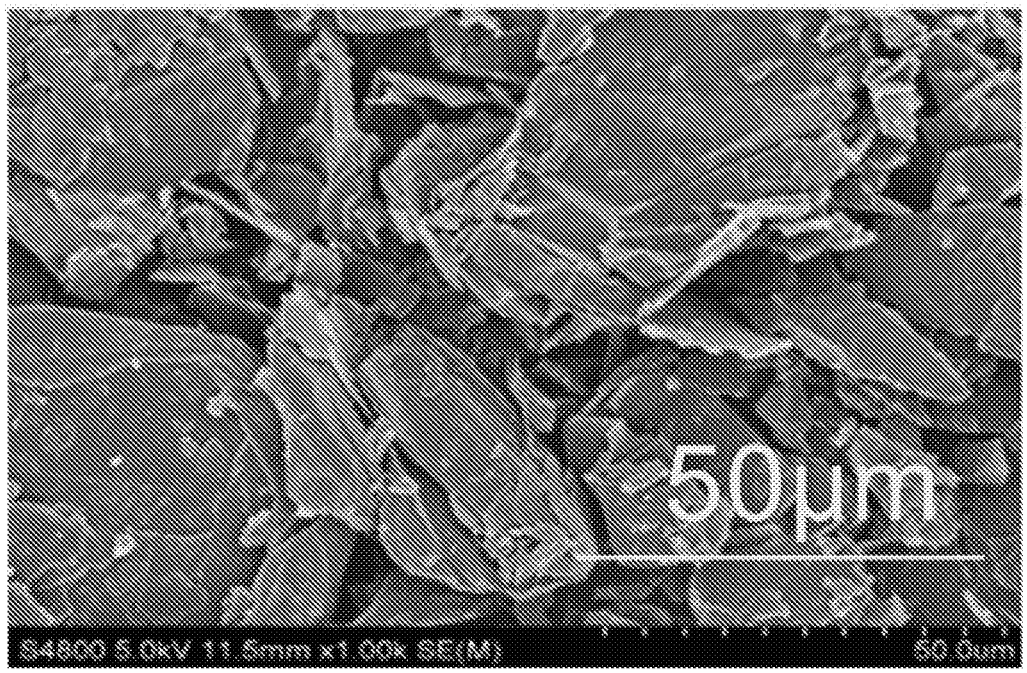
FIG. 10 is a SEM photograph of a graphite raw material.

FIG. 8 illustrates the relationship between the filler concentration and the coefficient of thermal expansion. The coefficients of thermal expansion of (1), (2), (6), (7) and (8) decrease with the filler concentration from the values in the case of resin alone and approach the values in the cases of filler alone (about $2 \times 10^{6\circ}$ $C.^{-1}$ for graphite). From this, the filler-loaded resin molded articles of the Examples can be controlled so as to decrease the difference in the coefficient of thermal expansion with semiconductor elements or ceramic substrates ($3 \times 10^{-6}$ to $8 \times 10^{-6\circ}$ $C.^{-1}$), or the difference in the coefficient of thermal expansion with metals such as copper ($17 \times 10^{-6\circ}$ $C.^{-1}$) and aluminum ($24 \times 10^{-6\circ}$ $C.^{-1}$). On the contrary, it is understood that in (3), (4) and (5), the degree of change is small, and it is difficult to control.

Examples 24 to 27

A composition of BN:PPS (90%:10% by weight) and compositions of GF:PPS (90%:10% by weight, 60%:40% by weight, and 40%:60% by weight) were newly provided by the same method as that used in Example 1.

These compositions were separately loaded in a mold having a size of 40 mm in length×40 mm in width at the percentage by volume (volume %) indicated in Table 8 so as to form a multilayer structure having a thickness of 10 mm, and integrated molding of different materials or integrated molding of different/gradient materials was carried out using the same method as that used in Example 1. Thus, molded article specimens having an insulating material and a conductive material laminated therein were produced (Examples 24 to 26). Meanwhile, regarding the gradient materials, various GF-PPS layers (the coefficients of thermal expansion are $2.06 \times 10^{-6}$, $22.4 \times 10^{-6}$, and $40.5 \times 10^{-6\circ}$ $C.^{-1}$, respectively) were filled in the mold in the order that the coefficient of thermal expansion is closer to that of a BN-PPS layer ($7.63 \times 10^{-6\circ}$ $C.^{-1}$).

Furthermore, a specimen (molded article) in which an electrically conductive material was bonded to an insulating material with an adhesive was produced by separately molding a BN-PPS layer and a GF-PPS layer with the composition of Table 8, and bonding the both with an adhesive agent (ARON ALPHA (registered trademark)) (Example 27).

The density of the specimen (molded article) thus obtained, the thermal conductivity from the BN and GF layer side, the surface electrical conductivity from the GF layer side, the electrical conductivity from the BN side, and the bending strength and flexural modulus of elasticity from the BN side were measured by the same methods as those used in Example 1. The results thus obtained are presented in Table 8.

TABLE 8

|  |  | Example | | | |
| --- | --- | --- | --- | --- | --- |
|  |  | 24 | 25 | 26 | 27 |
| Composition | BN(90)-PS (10) layer (vol %) | 20 | 10 | 10 | 20 |
|  | GF(90)-PS(10) layer (vol %) |  | 30 | 10 |  |
|  | GF (60)-PPS (40) layer (vol %) | 80 | 30 | 40 |  |
|  | GF (40)-PS (60) layer (vol %) |  | 30 | 40 | 80 |
| Molded article | Bonded state of different materials | Integrated molding | | Adhesive | |
|  | Density (g/cm$^2$) | 1.62 | 1.79 | 1.77 | 1.69 |
|  | Thermal conductivity from BN side (W/mK) | 23.2 | 22.4 | 20.8 | 4.44 |
|  | Thermal conductivity from GF side (W/mK) | 25.3 | 20.3 | 18.2 | 16.23 |
|  | Electrical conductivity from BN side (($\Omega$cm)$^{-1}$) | $6 \times 10^{-14}$ | $6 \times 10^{-14}$ | $6 \times 10^{-14}$ | $6 \times 10^{-14}$ |
|  | Surface electrical conductivity from GF side (($\Omega$cm)$^{-1}$) | 33.6 | 7.93 | 6.21 | 12.9 |
|  | Bending strength from BN side (MPa) | 25 | 37 | 40 | 25 |
|  | Flexural modulus of elasticity from BN side (GPa) | 1.5 | 2.2 | 2.5 | 0.8 |

According to the comparison between Example 24 and Example 27, integrated molding and bonding with an adhesive have a significant difference in the thermal conductivity, and it is understood that a product obtained by integrated molding is superior. Measurement of the thermal conductivity by a hot disc method is to determine the thermal conductivity in the vicinity of the surface of a specimen having a certain depth, and therefore, the BN side and the GF side have different thermal conductivities. Since the thermal conductivity of the BN(90)-PPS(10) layer alone is 24.0 W/mK, this is almost consistent with the thermal conductivity from the BN side of the integrated molded product. Thus, no decrease was observed in the thermal conductivity at the interface between the GF-PPS layer and the BN-PPS layer. When the molded articles were bonded with an adhesive, it is speculated that the thermal conduction properties on the adhered surface is markedly decreased, so that a significant decrease in the thermal conductivity. The thermal conductivity from the GF side of Example 24 almost reflects the thermal conductivity of the GF(60)-PPS(40) layer alone; however, the low value of the thermal conductivity of Example 27 is believed to have been affected by the adhered interface. In regard to the electrical conductivity, the BN side is an insulator in the order of $10^{-1}4$, with the electrical conductivity being measured with a high resistivity meter, and the GF side exhibits surface electrical conductivity measured with a low resistivity meter and is an electrical conductor. The electrical conductivity on the BN side implies that the BN side is an insulator under the effect of the BN-PPS layer, and thus this molded article can be used as a semiconductor substrate. Also in Examples 25 and 26 in which the GF-PPS layer was formed from a three-phase gradient material, excellent results were obtained similarly to Example 24. Thus, it is understood that bonding can be achieved by reducing the difference in the coefficient of thermal expansion between the BN-PPS layer and the GF-PPS layer, and reducing the difference in the coefficient of thermal expansion between the GF side and metals such as aluminum and copper.

Examples 28 and 29

Accordingly to Example 1, a GF-PPS resin composition (electrically conductive) having a GF concentration of 60% by weight was produced, and the composition was loaded into a mold having a size of 40 mm in length u 40 mm in width. Thus, a molded article having a thickness of 9.5 mm was produced. Separately, a PPS resin composition having a BN concentration of 90% by weight produced according to Example 22 was uniformly dispersed in methyl ethyl ketone (MEK) using ultrasonic waves, and thus a 25 wt % MEK coating liquid was produced. The coating liquid was applied and dried on the surface of the GF-PPS molded article, and then the molded article was subjected to press molding by heating under pressure in the same manner as in Example 1. Thus, an insulating/electrically conductive integrated molded article having a BN-PPS layer with a thickness of 0.5 mm was produced. The density, thermal conductivity, electrical conductivity, bending strength, and flexural modulus of elasticity were measured according to Example 24, and these values are presented in Table 9 as Example 28.

On the other hand, tetralin was introduced into a sealed pressure vessel to obtain a PPS content of 20% by weight, and the mixture of PPS and tetralin was heated to 230 qC under sealing to dissolve PPS. Thus, a PPS-tetralin solution was produced. An appropriate amount of t-butanol (TBA) was added to a BN-oxazine composition at a weight ratio of 80:20, which was separately produced according to Example 1, and thus a dispersion liquid was produced. The PPS-tetralin solution was added to this dispersion liquid such that the ratio of PPS:oxazine reached 10:90 as a weight ratio, and the mixture was further diluted with TBA. Thus, a TBA-dispersed coating liquid having a BN-(PPS-oxazine) (weight ratio 80:(2:18)) content of 25% by weight was produced. This coating liquid was uniformly dispersed by ultrasonication, and was applied and dried on the surface of the GF-PPS molded article. Subsequently, the coating liquid was heated to cure for 3 hours in a vacuum under the pressure of 0.5 MPa in a vacuum dryer at 250 qC, and thus a molded article coated with a BN-oxazine layer having a thickness of 0.5 mm was produced. Various physical properties were measured in the same manner as in Example 28, and these values are presented in Table 9 as Example 29.

TABLE 9

| | | Example | |
|---|---|---|---|
| | | 28 | 29 |
| Composition | BN(90)-PPS (10) layer (vol %) | 5 | — |
| | BN (80)-(PPS-oxazine) (20) layer (vol %) | — | 5 |
| | GF (60)-PPS (40) layer (vol %) | 95 | 95 |
| Molded article | Bonded state of different materials | Integrated molding | Coating film |
| | Density (g/cm$^2$) | 1.65 | 1.60 |
| | Thermal conductivity from BN side (W/mK) | 25.5 | 24.2 |
| | Thermal conductivity from GF side (W/mK) | 26.1 | 20.5 |
| | Electrical conductivity from BN side (($\Omega$cm)$^{-1}$) | 7 × 10$^{-14}$ | 8 × 10$^{-14}$ |
| | Surface electrical conductivity from GF side (($\Omega$cm)$^{-1}$) | 35.8 | 36.5 |
| | Bending strength from BN side (MPa) | 33 | 30 |
| | Flexural modulus of elasticity from BN side (GPa) | 2.5 | 2.0 |

Examples 30 to 33

A 60 wt % GF-PPS resin composition (electrically conductive) was produced according to Example 28, and a resin molded article block having a size of 149.4 mm in length u 149.4 mm in width u 34.5 mm in thickness was produced using a square-shaped mold which measured 150 mm in length and width.

This molded article block was subjected to machining, and thereby a GF heat dissipation component of a comb type fin structure having a basal part measuring 149.4 mm in length and width and a thickness of 12.0 mm, and 15 sheets of rectangular fins each measuring 2.5 mm in thickness, 22.5 mm in depth, and 149.4 mm in length arranged thereon at an equal interval, was produced. The weight of the heat dissipation component was 628 g, the surface area was 1544 cm2, the specific heat capacity was 1.158 J/gK, and the density was 1.892 g/cm2. This GF heat dissipation component was bonded with a 7.68-W heater (manufactured by Japan Marina Co., Ltd., KAPTON HEATER HK9BF) embedded in a polyimide film, without an adhesive, or by sealing with tape, using a silicone grease (thermal conductivity 3.8 W/mK, manufactured by Shenzhen Halnziye Electronics Co., Ltd.), or by applying and solid-drying a TBA dispersion coating liquid formed from the BN-(PPS-oxazine) composition at a weight ratio of 80:2:18 used in Example 29, and subsequently performing a thermal curing reaction for 2 hours at 100° C. and then for 3 hours at 230° C. in a vacuum. Thus, heat dissipation components were produced, and a heat dissipation test was carried out in a thermostatic chamber at 30° C. Thermocouples were attached to three sites, including the heater part, the fin-rooted basal part, and the fin tips, and the heat dissipation behavior was measured. Thermal resistance was determined from the temperature at which an equilibrium state was reached, and the results are presented in Table 10 as Examples 30, 31 and 32. At the time point when equilibrium was reached, the temperature inside the thermostatic chamber had been elevated to 37.0 qC, and thus the time point was considered as an equilibrium point.

Furthermore, 88.7 g of a BN:PPS (80:20 wt %) composition and 1189.1 g of a GF:PPS (60:40 wt %) composition were prepared, and a resin integrated molded article block having a size of 149.4 mm in length u 149.4 mm in width u 34.5 mm in thickness, in which the BN:PPS layer was 2 mm in thickness and the GF:PPS layer was 30 mm in thickness, was produced according to Example 24, using a square-type mold measuring 150 mm in length and width. This molded article block was subjected to machining, and thereby a GF heat dissipation component having a comb-type fin structure having a basal part measuring 149.4 mm in length and width and a thickness of 12.0 mm, and 15 sheets of rectangular fins each measuring 2.5 mm in thickness, 22.5 mm in depth, and 149.4 mm in length arranged thereon at an equal interval, was produced. The weight of the heat dissipation component was 664 g, and the surface area was 1544 cm2. A heat dissipation experiment was carried out in the same manner as in Example 30 to determine the equilibrium temperature and the thermal resistance. The results are presented in Table 10 as Example 33.

TABLE 10

| | Example and Comparative Example | | | |
|---|---|---|---|---|
| | Example 30 | Example 31 | Example 32 | Example 33 |
| Kind of comb-type fin structured heat dissipation component | GF heat dissipation component | GF heat dissipation component | GF heat dissipation component | GF heat dissipation composition |
| Bonding of heater and fin-type heat dissipation unit | None | Silicone grease | BN-(PPS-oxazine) adhesive | (BN-PPS)-(GF-PPS) integrated molding |
| Equilibrium temperature (T$_1$) of heater part | 97.6 | 66.9 | 66.5 | 67.2 |
| Equilibrium temperature (T$_2$) of fin-rooted basal part | 47.8 | 49.8 | 50.4 | 51.1 |
| Equilibrium temperature (T$_3$) of fin-rooted basal part | 44.7 | 46.9 | 47.7 | 47.6 |
| Atmospheric temperature of constant temperature tank(T$_4$) | 37.0 | 37.0 | 37.0 | 37.0 |
| Thermal resistance for T$_1$ and T$_2$ (R$_1$) | 6.48 | 2.23 | 1.94 | 2.10 |
| Thermal resistance for T$_2$ and T$_3$ (R$_2$) | 0.40 | 0.38 | 0.35 | 0.46 |
| Thermal resistance for T$_3$ and T$_4$ (R$_3$) | 1.00 | 1.29 | 1.39 | 1.38 |

TABLE 10-continued

| | Example and Comparative Example | | | |
|---|---|---|---|---|
| | Example 30 | Example 31 | Example 32 | Example 33 |
| Thermal resistance for $T_1$ and $T_4$ ($R_T$) | 7.88 | 3.89 | 3.68 | 3.94 |

It was found from Table 10 that as compared with Example 30 of the case without an adhesive, when silicone grease (Example 31), an adhesive (Example 32), and integrated molding (Example 33) were carried out, the equilibrium temperature of the heater part decreased significantly. Also, it was found that in regard to the value of thermal resistance, contribution of the thermal resistance on the heat dissipation to the interface between the heater and the heat dissipation component (R2) and to the interface between the heat dissipation component and the atmosphere (R3) was larger than the contribution of the thermal resistance of the material itself (R1).

The invention claimed is:

1. A method for producing a high filler-loaded thermally conductive material, the method comprising the steps of:
   (1) preparing a composition which consists of organic polymer particles and a thermally conductive filler having a graphite-like structure, including 5 to 60% by weight of the organic polymer particles, and 40 to 95% by weight of the thermally conductive filler having a graphite-like structure, relative to 100% by weight of the total amount of these components, wherein the thermally conductive filler is dispersed by delamination while maintaining the average planar particle size of the thermally conductive filler, and wherein the thermally conductive filler is capable of forming a thermally conductive infinite cluster;
   (2) press-molding the composition at a temperature higher than or equal to the deflection temperature under load, melting point, or glass transition temperature of the organic polymer, and at a pressure of 1 to 1000 kgf/cm$^2$; and
   (3) cooling and solidifying the material formed in step (2).

2. The method for producing a high filler-loaded high thermal conductive material according to claim 1, wherein a ball mill is used as a means for dispersing the thermally conductive filler by delamination while maintaining the average particle size of the thermally conductive filler.

3. The method for producing a high filler-loaded high thermal conductive material according to claim 1, wherein
   the organic polymer particles contain at least one selected from the group consisting of a thermoplastic resin, a thermoplastic elastomer, an uncrosslinked thermosetting resin, all of which have crystallinity and/or aromaticity, and
   the thermally conductive filler having a graphite-like structure includes at least one selected from the group consisting of natural graphite, artificial graphite, and hexagonal boron nitride.

4. The method for producing high filler-loaded high thermal conductive material according to claim 1, wherein the organic polymer particles are formed from at least one polymer selected from the group consisting of a thermoplastic resin having crystallinity and/or aromaticity, a thermoplastic elastomer having crystallinity and/or aromaticity, and an uncrosslinked thermosetting resin.

5. The method for producing a high filler-loaded high thermal conductive material according to claim 1, wherein the organic polymer particles are formed from at least one selected from the group consisting of a thermoplastic resin and a thermoplastic elastomer, both of which have crystallinity and/or aromaticity.

6. The method for producing a high filler-loaded high thermal conductive material according to claim 1, wherein
   the average particle size of the organic polymer particles is 1 to 5000 µm,
   the average particle size of the thermally conductive filler having a graphite-like structure is 0.5 to 2000 µm, and
   the average particle size of the composition is 0.5 to 1000 µm.

7. The method for producing a high filler-loaded high thermal conductive material according to claim 1, wherein
   the average particle size of the thermally conductive filler having a graphite-like structure is 3 to 200 µm, and
   the average particle size of the composition is 1 to 100 µm.

8. The method for producing a high filler-loaded high thermal conductive material according to claim 1, wherein the thermally conductive filler having a graphite-like structure is natural graphite and/or artificial graphite, and
   has a thermal conductivity of 10 to 150 W/mK,
   a coefficient of thermal expansion of $3\times10^{-6}$ to $30\times10^{-6}$ °C.$^{-1}$, and
   a surface electrical conductivity of 5 to 250 $(\Omega cm)^{-1}$.

9. The method for producing a high filler-loaded high thermal conductive material according to claim 1, wherein the thermally conductive filler having a graphite-like structure is hexagonal boron nitride, and
   has a thermal conductivity of 5 to 50 W/mK,
   a coefficient of thermal expansion of $3\times10^{-6}$ to $30\times10^{-6}$ °C.$^{-1}$, and
   a surface electrical conductivity of $10^{-10}$ $(\Omega cm)^{-1}$ or less.

10. The method for producing high filler-loaded high thermal conductive material according to claim 1, wherein the organic polymer includes at least one selected from the group consisting of polyphenylene sulfide, polyethylene terephthalate, polybutylene terephthalate, polycarbonate and benzoxazine, and
    the thermally conductive filler having a graphite-like structure includes scale-like graphite and/or hexagonal boron nitride.

11. A method for producing a molded article, comprising producing the high filler-loaded high thermal conductive material according to claim 1, and
    molding the high filler-loaded high thermal conductive material.

12. The method for producing a molded article according to claim 11,
    wherein the molded article is formed by laminating two layers of the high filler-loaded high thermal conductive material;
    one layer of the two layers has a thermal conductivity of 15 to 120 W/mK and a coefficient of thermal expansion of $3\times10^{-6}$ to $30\times10^{-6}$ °C.$^{-1}$, and exhibits electrical conductivity with a surface electrical conductivity of 10 to 200 $(\Omega cm)^{-1}$; and the other layer of the two layers has a thermal conductivity of 5 to 50 W/mK or more and a coefficient of thermal expansion of $3 \times 10^{-6}$ to $10 \times 10^{-6}$ °C.$^{-1}$, and exhibits insulating properties with a surface electrical conductivity of $10^{-11}$ ($\Omega$cm)$^{-1}$ or less.

13. The method for producing a molded article according to claim 12, wherein the layers of the high filler-loaded high thermal conductive material are formed of a gradient material.

\* \* \* \* \*